United States Patent [19]

Brennen et al.

[11] Patent Number: 5,351,180

[45] Date of Patent: Sep. 27, 1994

[54] HIGHLY FAULT TOLERANT ACTIVE POWER LINE CONDITIONER

[75] Inventors: Michael B. Brennen; Steven A. Moran, both of Pittsburgh, Pa.; Scott K. Suko, Elkridge, Md.

[73] Assignee: Electric Power Research Institute, Inc., Palo Alto, Calif.

[21] Appl. No.: 969,772

[22] Filed: Oct. 30, 1992

[51] Int. Cl.⁵ .......................... H02M 1/12; G05F 1/70
[52] U.S. Cl. ..................................... 363/71; 323/207; 307/105; 363/40
[58] Field of Search ...................... 363/35, 37, 41, 71, 363/97, 98; 323/205, 207, 208, 209, 210; 307/105; 318/798, 803, 805-812; H02M 1/12, 5/40; G05F 1/70

[56] References Cited

U.S. PATENT DOCUMENTS

| | | |
|---|---|---|
| 3,863,140 | 1/1975 | Easter et al. . |
| 4,063,144 | 12/1977 | Hucker et al. . |
| 4,410,935 | 10/1983 | Dang . |
| 4,460,834 | 7/1984 | Gottfried . |
| 4,473,756 | 9/1984 | Brigden et al. . |
| 4,564,767 | 1/1986 | Charych . |
| 4,651,265 | 3/1987 | Stacey et al. . |
| 4,686,375 | 8/1987 | Gottfried . |
| 4,713,745 | 12/1987 | Schauder . |
| 4,728,808 | 3/1988 | Bet-Esh et al. . |
| 4,800,326 | 1/1989 | Unsworth . |
| 4,811,236 | 3/1989 | Brennen et al. . |
| 4,812,779 | 3/1989 | Wagner . |
| 4,814,683 | 3/1989 | Okamoto et al. . |
| 4,827,150 | 5/1989 | Reynal . |
| 4,835,454 | 5/1989 | White . |
| 4,862,054 | 8/1989 | Schauder . |
| 4,876,460 | 10/1989 | Johnson . |
| 4,937,720 | 6/1990 | Kirchberg . |
| 4,943,783 | 7/1990 | Nojima . |
| 4,962,339 | 10/1990 | Schauder . |
| 4,962,976 | 10/1990 | Takahashi et al. . |
| 4,980,812 | 12/1990 | Johnson, Jr. et al. . |
| 4,994,956 | 2/1991 | Kirchberg et al. . |
| 4,996,462 | 2/1991 | Krummel . |
| 5,001,619 | 3/1991 | Nakajima et al. . |
| 5,016,157 | 5/1991 | Rozman et al. . |
| 5,038,092 | 8/1991 | Asano et al. . |

(List continued on next page.)

OTHER PUBLICATIONS

Khater, Faeka et al; "The Selection of Flux Level in Field Oriented Induction Machine Controllers With Consideration of Magnetic Saturation Effects", *IEEE*, 1986, pp. 124–131.

Novotny, D. W. et al, "Introduction to Field Orientation and High Performance AC Drives", IEEE Industry Applications Society Annual Meeting.

Proc. 4th Euro. Conf. on Power Electronics and Applications, Florence, Italy, 1991, vol. 3, pp. 30–35.

(List continued on next page.)

*Primary Examiner*—Emanuel T. Voeltz
*Attorney, Agent, or Firm*—Flehr, Hohbach, Test, Albritton & Herbert

[57] ABSTRACT

An improved active power line conditioner is disclosed. The active power line conditioner includes a series inverter coupled to an energy input source, and a parallel inverter coupled to a non-linear load. The non-linear load is powered by a load current which includes fundamental components and harmonic components. An energy storage element is electrically connected between the series inverter and the parallel inverter. The parallel inverter is used for current control functions, while the series inverter is used for instantaneous output voltage regulation. In one embodiment of the invention, a parallel current limiter is used for the parallel inverter. The parallel current limiter is fixed to satisfy specified output voltage total harmonic distortion requirements or peak to rms output current ratios in the active power line conditioner. A series current limiter may be used for the series inverter. The series current limiter is set slightly above the peak of the active power line conditioner input current fundamental. This allows the onset of a small intentional peak output voltage distortion that in turn limits excessive nonlinear load peak currents without back feeding of current harmonics into the input supply of the active power line conditioner.

29 Claims, 28 Drawing Sheets

U.S. PATENT DOCUMENTS

| | | |
|---|---|---|
| 5,047,909 | 9/1991 | Hosoda . |
| 5,047,910 | 9/1991 | Levran et al. . |
| 5,047,914 | 9/1991 | Dhyanchand et al. . |
| 5,051,704 | 9/1991 | Chapman et al. . |
| 5,075,634 | 12/1991 | French . |
| 5,077,532 | 12/1991 | Obermann et al. . |

OTHER PUBLICATIONS

Peng, F. Z. et al; "A New Approach to Harmonic Compensation in Power Systems", IEEE/IAS Annual Meeting, pp. 874–880, 1988.

Banerjee, B. Ben et al; "Design of an Active Series/Passive Parellel Harmonic Filter For ASD Loads at a Wastewater Treatment Plant", Proc. of the 2nd International Power Quality Applications Conference, PQA, '92, Atlanta 1992.

$F_q = F_a$
$F_d = \frac{-1}{\sqrt{3}} F_a - \frac{2}{\sqrt{3}} F_b$ $\begin{vmatrix} F_q \\ F_d \end{vmatrix} = \begin{vmatrix} \cos\theta & -\sin\theta \\ \sin\theta & \cos\theta \end{vmatrix} \begin{vmatrix} F_q^s \\ F_d^s \end{vmatrix}$

VECTOR ROTATION EQUATIONS $\hat{F}_{qd} = \varepsilon^{-j\theta} \hat{F}^s{}_{qd}$ WHERE $\hat{F}_{qd} = F_q - jF_d$
$\hat{F}^s{}_{qd} = F^s{}_q - jF^s{}_d$ $$\begin{vmatrix} F_q^s \\ F_d^s \end{vmatrix} = \begin{vmatrix} \cos\theta & \sin\theta \\ -\sin\theta & \cos\theta \end{vmatrix} \begin{vmatrix} F_q \\ F_d \end{vmatrix}$$

$F_a = F_q$ $F_b = \dfrac{-1}{2} F_q - \dfrac{\sqrt{3}}{2} F_d$ $F_c = -F_a - F_b$

VECTOR ROTATION $\hat{F}^s_{qd} = \varepsilon^{j\theta} \hat{F}_{qd}$

WHERE $\hat{F}_{qd} = F_q - jF_d$ $\hat{F}^s_{qd} = F^s_q - jF^s_d$

3-PHASE TO 2-PHASE TRANSFORMATION $$\begin{bmatrix} id_s \\ iq_s \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{loada} \\ i_{loadb} \\ i_{loadc} \end{bmatrix}$$

HIGHLY FAULT TOLERANT ACTIVE POWER LINE CONDITIONER

The present application is related to the following commonly assigned applications:
Active Power Line Conditioner with Synchronous Transformation Control, filed Oct. 30, 1992, Ser. No. 07/968,850;
Active Power Line Conditioner with Fundamental Negative Sequence Compensation, filed Oct. 30, 1992, Ser. No. 07/969,932;
Active Power Line Conditioner with Fast Dynamic Response, filed Oct. 10, 1992, Ser. No. 07/969,344;
Active Power Line Conditioner with Low Cost Surge Protection, filed Oct. 30, 1992, Ser. No. 07/969,137;
Load Current Fundamental Filter With One Cycle Response, filed Oct. 30, 1992, Ser. No. 07/969,081;
Harmonic Controller for an Active Power Line Conditioner, filed Oct. 30, 1992, Ser. No. 07/968,847; and
Low Cost Active Power Line Conditioner, filed Mar. 12, 1993, Ser. No. 08/030,783.

BRIEF DESCRIPTION OF THE INVENTION

This invention relates generally to protecting the internal circuitry of active power line conditioners from fault conditions. This invention more particularly relates to a highly fault tolerant active power line conditioner which employs a parallel inverter for current control functions and a series inverter for instantaneous output voltage regulation.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency several times higher than the fundamental.

Inverter switching action generates transients and spurious frequencies in a power signal, usually in the form of harmonics of the switching frequency. The switching action may also produce electromagnetic interference (EMI) which is radiated or conducted through the supply line. While the internal design of an inverter is chosen to minimize transients and spurious frequencies, it is usually necessary to filter the input or the output of the inverter.

Filters can be classified according to whether their main purpose is to improve the power waveform or to remove EMI. Filters for waveform improvement usually deal with frequencies in the audio range. EMI filters are usually concerned with frequencies of 455 kHz or higher.

Passive filters are typically used to eliminate undesirable harmonics from the inverter output. Unfortunately, passive filters do not provide continuous harmonic filtering on pulsating or randomly varying loads. This occurs because passive filters only adapt to new harmonic levels after a considerable settling delay.

Passive filters tend to be large, heavy, costly, and, in general, highly load-dependent. Consequently, passive filters frequently represent a substantial part of the total cost, weight, and size of power electronics equipment.

Active filters represent an emerging technology without many of the shortcomings associated with passive filters. The technology relies upon the theory of active-feedback filters. A feedback loop with a single energy-storage element (an inductor or capacitor) is used to minimize the difference between the actual waveform and the desired waveform.

The urgency of developing successful active power filters has recently grown in view of the increasing waveform distortion of both voltages and currents in ac power distribution systems. These distortions are largely attributable to a growing number of nonlinear loads in the electric utility power network. Typical nonlinear loads are computer controlled data processing equipment, numerical controlled machines, variable speed motor drives, robotics, medical and communication equipment.

Nonlinear loads draw square wave or pulse-like currents instead of purely sinusoidal currents drawn by conventional linear loads. As a result, nonlinear current flows through the predominantly inductive source impedance of the electric supply network. Consequently, a non-linear load causes load harmonics and reactive power to flow back into the power source. This results in unacceptable voltage harmonics and load interaction in the electric power distribution in spite of the existence of voltage regulators.

The degree of current or voltage distortion can be expressed in terms of the relative magnitudes of harmonics in the waveforms. Total Harmonic Distortion (THD) is one of the accepted standards for measuring voltage or current quality in the electric power industry.

Apart from voltage and current distortion, another related problem may arise when nonlinear loads are connected to the electric power network. In particular, when the load current contains large amounts of third or other triplen harmonics, the harmonic current tends to flow in the neutral conductor of the power system. Under these conditions, the neutral current can exceed the rated current of the neutral conductor. Since the neutral is normally designed to carry only a fraction of the line current, overheating or even electric fires can result.

As previously indicated, active filters may be used to alleviate these problems. Active filters, or active power line conditioners (APLCs), comprise one or two pulse width modulated inverters in a series, parallel, or series-parallel configuration. The inverters share a common dc link, which can be a dc inductor (current link) or a dc capacitor (voltage link). It is advantageous to keep the energy stored in the dc link (capacitor voltage or inductor current) at an essentially constant value. The voltage on the dc link capacitor can be regulated by injecting a small amount of real current into the dc link. The injected current covers the switching and conduction losses inside the APLC. The link voltage control can be performed by the parallel inverter.

The basic active load current compensation with current or voltage source filters is known. FIG. 1 depicts a parallel connected current source active filter 20, and FIG. 2 depicts a parallel connected voltage source active filter 22. The load current $I_L$ consists of three components: The real current, $I_r$, the reactive current, $I_q$, and the ripple current, $I_R$. The parallel connected active filter supplies the $I_R$ and $I_q$ components, and, also, a small residual "high frequency" component $I_{hf}$, that flows into the parallel connected "high frequency" capacitor $C_{hf}$. The parallel connected active filter is essentially a single or multi-phase inverter which is operated from an isolated current or voltage source.

The realization of the active filter requires solid state switches with intrinsic turn-off capability (transistors, IGBTs, MOSFETs, GTOs, etc.). Switch pairs P1 and P2 are alternately turned ON and/or OFF. The average voltage required in the link capacitor $V_{dc}$, of FIG. 2, is supplied by the ac source. Real power can be absorbed by introducing an appropriate amount of offset in the symmetry of the on-times in switches P1 and P2. The polarity of the offset is coordinated with the polarity of the input voltage. When switches P1 of FIG. 2 are on, a resonant current is generated between the tie inductor, Lp, the output capacitance dominated by $C_{hf}$, and the difference between the dc link and ac output voltages. Conversely, when the P2 switch pair is on, the resonant current is driven by the sum of the dc link and ac output voltages. Since the dc link voltage is regulated to be larger than the peak value of the ac voltage, the voltage polarity that drives the resonant current will reverse after each complementary pole switching.

The real power, necessary to maintain the selected dc link voltage magnitude, Vdc, is proportional to the average duty cycle of high-frequency pole switchings in any given half line voltage cycle. The isolated dc link voltage is regulated by a closed loop controller that affects the average pole switching symmetry. Reactive inverter currents can be produced that flow in or out of the inverter by temporary changes in the duty cycle of inverter pole switchings. The instantaneous magnitudes of inverter currents are regulated so that they provide the load compensation current requirements. For example, if a positive ripple current is detected, the on-time of P2 is increased with respect to P1. The increase results in the required net compensating ripple current flowing in the ac line. This also implies that the amplitude of Vdc must be kept higher than the highest value of the ac voltage across the load, otherwise, the instantaneous compensation capability of the active filter is impaired.

The rapid pulse width modulation switching in the active filter produces a high frequency, typically, triangular shaped current, $I_{hf}$, an undesired side effect. The effect of the $I_{hf}$ signal is a small, superimposed saw-tooth voltage ripple on the ac voltage. With a given tie inductor value, the amplitude of the voltage ripple is inversely proportional to the pole switching (carrier) frequency and the value of $C_{hf}$. The voltage ripple is filtered with a parallel capacitor $C_{hf}$.

When the active power filter (20 or 22) is connected across the load, a high degree of filtering of the terminal voltage is observed. Note that the active power filter is not capable of supplying or absorbing any real power other than that which is needed to compensate for losses inside the filter itself. It will, however, readily compensate reactive currents, non-synchronous and non-theoretical harmonics and sources with variable or unregulated frequency. The shunt connected power circuit is inherently protected under load short circuits since the load fault current bypasses the active power filter.

The isolated dc link circuits of FIGS. 1 and 2 can be combined to produce an ac line conditioner and voltage regulator. FIG. 3 depicts a shared link current source active power filter 24 with a serial inverter 26 and a parallel inverter 28. FIG. 4 depicts a shared link voltage source active power filter 30, with a serial inverter 32, and a parallel inverter 34. The respective series and parallel inverters are similar to the filters described in relation to FIGS. 1 and 2. The shared link approach of FIGS. 3 and 4 represents a combination of series and shunt connected filters which are operated from a common shared direct voltage (or current) source.

The shared link circuit topology removes the former limitation of the active power filter, namely, that it is not capable of supplying or absorbing any real power, apart from compensating for the losses in the active power filter itself. In the shared dc link series and parallel circuit topology, it becomes possible for both the series and the parallel filter elements to absorb or generate real power at the fundamental frequency, or other frequencies, provided the total power absorbed equals the total power generated.

The series active elements (26 and 32) may be modulated to provide a fundamental voltage of controllable magnitude and phase so that the phase and magnitude of the ac output voltage stays sinusoidal at any required level and phase angle with respect to the ac input. The power required by the series element (26 or 32) is absorbed from or injected into the dc link (36 or 38). Link energy is then maintained by appropriately controlling the phase and magnitude of the fundamental modulating signal applied to the parallel connected element (28 or 34). The result is that the power needed by the series element (26 or 32) will be obtained from the parallel element (28 or 34). Similarly, power generated by the series element (26 or 32) will be returned into the ac output by the parallel element (28 or 34).

When the output and input voltages are not equal, the series inverter (26 or 32) delivers real power to or from the dc link (26 or 38). The amount of power exchange delivered with respect to the output power depends on the fundamental Vo/Vin ratio. When the Vo/Vin ratio is smaller than unity, the real part of the input current becomes larger than the output (load) real current. The difference between the output and input currents flows through both inverters via the dc link (36 or 38). Appropriate fast-acting controls insure that the power flow between the series and parallel inverters is kept equal on the average, so that the power flow does not significantly alter the stored energy in the shared dc link.

In addition to the regulation of the buck/boost power transfer, the parallel active element (28 or 34) is modulated at ripple frequency so that it provides a bypass for load generated ripple currents and, if required, for the reactive fundamental current of the load. After full compensation of ripple and reactive components, only real fundamental current is drawn from the ac input.

In spite of sharing a common dc link, both the series and parallel inverters can be independently controlled to exhibit reactance at fundamental frequency, by appropriate adjustments of their fundamental modulating signals. This is useful for phase correction of the output voltage if necessary, and for compensating unbalanced reactive loads in multiphase ac power systems. Another important observation is that due to the nature of the active power filter, its operation as a variable capacitor at fundamental frequency will not cause any undesirable resonances at harmonic or modulation frequencies.

Certain types of electrical loads, such as synchronous and induction motors, require balanced three phase voltages. Small voltage unbalances in such devices, attributable to a negative sequence fundamental, can result in significantly larger current unbalances, resulting in an over-current stator winding condition, excessive stator winding temperature, excessive motor noise, and higher motor core losses. Thus, motor lifetime and reliability are adversely affected. Therefore, a desirable Active Power Line Conditioner will have the capability to provide balanced load voltages in the presence of unbalanced source voltages. It is also desirable to have the capability to force balanced source currents if the load currents are unbalanced due to unbalanced phase impedances. In other words, it is desirable to provide an active power line conditioner which eliminates the negative sequence fundamental.

Active power line conditioners endeavor to improve the power available for a load. Harmonics in a load current reduce the power factor of the load, while causing distortion and interference problems. Anything less than unity power factor reduces the amount of power that can be drawn from an ac power supply. The reduction of available power is characterized by the given line impedance of the electric network. Input power factor (PF) is defined as the ratio of true input power, Pt, to apparent input power, Pa: PF=Pt/Pa. If the ac input voltage is sinusoidal, the true input power is the result of the rms value for the input voltage multiplied by the rms value of the in-phase component of the fundamental input current. The "in-phase" component of the fundamental input current is a sinusoidal quantity having a zero phase displacement with respect to the sinusoidal input voltage. The harmonic currents of the load increase the rms value for the load current but not the fundamental value. Only the in-phase component of the fundamental load current contributes to the power consumed by the load. Generally, the phase of the load current fundamental is not in phase with the input voltage. If the input voltage is not sinusoidal, the calculation of the load power factor becomes even more complex.

Equipment with nonlinear load currents may include conventional linear lagging or leading loads. The application of linear lagging or leading loads results in less than unity "displacement power factor". The conventional displacement power factor, DPF, is caused by phase shift in the fundamental as opposed to the load harmonics caused power factor, HPF, that appears as an increase in the rms value of non-sinusoidal load current. Conventional loads are, for example, cooling fans with lagging power factor. These two kinds of power factors can coexist in varying ratios but each of them affects the terminal voltage in an adverse fashion and, therefore, some of the other loads connected to the power bus.

Thus, a unified power factor controller is needed to alleviate power factor related efficiency and load voltage drop problems at the input terminals of an active power line conditioner. It would be highly desirable to provide a unified power factor controller with fast dynamic response following step changes caused by the application or removal of a load.

The series transformer of an active power line conditioner, by default of its series connection, must carry the difference of currents between the active power line conditioner load and the parallel inverter. The inrush current problem into the dc link capacitor on start-up of the APLC is generally solved by dedicated link current limiting circuitry. The handling of load current surges without undue overrating of APLC components is an important consideration in producing a cost-effective commercial product.

In relatively smaller power applications, the series transformer has a higher than 1:1 turns ratio. The selected higher than 1:1 ratio is in accordance with the particular series voltage support requirement for the series inverter. When this is the case, the series inverter is not capable of full limitation of the short circuit current. The magnitude of the short circuit current will be determined by the unsupported line voltage and source/short-circuit impedances in the overall network. On the other hand, the non-unity transformer ratio means higher reflected ac voltages that are applied to the series inverter. If the series inverter is rated to handle the high surge voltages, the parallel inverter must also be rated to the same high voltage, since the two inverters share a common dc voltage link. In fact, the dc link must be charged to a higher than peak ac voltage level in order to maintain current control and thus avoid false, series inverter over-current trips. To rate the inverters for these surge voltage and surge current rating requirements may not result in a commercially competitive product. Thus, it is important to develop a cost-effective APLC which complies with surge rating requirements in a different way.

The surge protective functions override the active power quality controllers in an active power line conditioner. Consequently, a protective function, while in effect, can result in a temporary compromise in the output power quality, such as: elimination of output voltage regulation, injection of load harmonics back into the source, and uncompensated input voltage harmonics. Thus, it would be highly desirable to provide an active power line conditioner which quickly recovers from transient conditions when internal protections are activated. In other words, it would be highly desirable to provide an active power line conditioner which is highly tolerant to system transients and to the activation and deactivation of active power line conditioner protective features.

A number of control strategies are applied to ac machines. In general, ac machine control theory is directed toward providing accurate mechanisms for controlling the torque of a machine. Torque control in an ac machine is obtained by managing a current vector composing amplitude and phase terms. The control of ac machines is complicated by the requirement of external control of the field flux and armature mmf spatial orientation. In the absence of such a control mechanism, the space angles between the various fields in an ac machine vary with load and result in oscillations or other unfavorable physical phenomenon. Control systems for ac machines which directly control the field flux and armature mmf spatial orientation are commonly referred to as "field orientation" or "angle" controllers. Such controllers employ synchronous transformations, as will be described below.

The fundamental principles of field orientation control of ac motors is described in Introduction to Field Orientation and High Performance AC Drives, IEEE Industrial Drives Committee of the IEEE Industry Applications Society, Oct. 6–7, 1986. Field orientation principles rely upon the fact that the rotor of a motor has two axes of magnetic symmetry. One axis is known as the direct axis, and the other axis is known as the quadrature axis. These terms are usually shortened to simply refer to the d-axis and the q-axis.

Field orientation techniques endeavor to control the phase of the stator current to maintain the same orientation of the stator mmf vector relative to the field winding in the d-axis within the d-q scheme. FIG. 5 depicts a symbolic representation of a field orientation control system and its corresponding mathematical model. The three phase system (a, b, c) is first synchronously transformed to a two phase ds-qs scheme which is stationary with respect to the three phase system. This 3-phase to 2-phase transformation is equivalent to a set of linear equations with constant coefficients, as shown in FIG. 5.

The second step is the synchronous transformation from stationary d-q variables to rotating d-q variables. This transformation involves the angle Θ between the two systems and is described by the matrices given in the figure. The rotation transformation is often referred to as a "vector rotation" since the d-q quantities can be combined as a vector and the transformation then amounts to the rotation of one vector with respect to the other. FIG. 5 includes the vector rotation equations.

FIG. 6 depicts the inverse synchronous transformations to those performed in FIG. 5. Initially, a rotating-to-stationary synchronous transformation is made using the matrices depicted in FIG. 6. After the stationary rotor reference frame variables are established, a two phase to three phase synchronous transformation is made, consistent with the equations provided in the figure.

OBJECTS AND SUMMARY OF THE INVENTION

It is a general object of the present invention to provide an improved active power line conditioner.

It is a general object of the present invention to provide an active power line conditioner which is highly tolerant to fault conditions produced by load or system disturbances.

It is another object of the invention to provide an active power line conditioner which utilizes a parallel inverter for current control functions.

It is a related object of the invention to provide an active power line conditioner which utilizes a series inverter for output voltage control functions.

It is a another object of the invention to provide an active power line conditioner which quickly recovers from transient conditions when internal protections are activated.

It is another object of the invention to provide an active power line conditioner which shorts out its series inverter in the presence of transient fault conditions.

It is another object of the invention to provide voltage regulation with a series inverter to reduce interaction between inverter controls.

It is another object of the invention to provide an active power line conditioner which utilizes a fixed current limiter in the parallel inverter and an adaptive current limiter in the series inverter.

These and other objects are achieved by an improved active power line conditioner in accordance with the invention. The active power line conditioner includes a series inverter coupled to an energy input source, and a parallel inverter coupled to a non-linear load. The non-linear load is powered by a load current which includes fundamental components and harmonic components. An energy storage element is electrically connected between the series inverter and the parallel inverter. The parallel inverter is used for current control functions, while the series inverter is used for instantaneous output voltage regulation. In one embodiment of the invention, a parallel current limiter is used for the parallel inverter. The parallel current limiter is fixed to satisfy specified output voltage total harmonic distortion requirements or peak to rms output current ratios in the active power line conditioner. A series current limiter may be used for the series inverter. The series current limiter is set slightly above the peak of the active power line conditioner input current fundamental. This allows the onset of a small intentional peak output voltage distortion that in turn limits excessive nonlinear load peak currents without back feeding of current harmonics into the input supply of the active power line conditioner.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
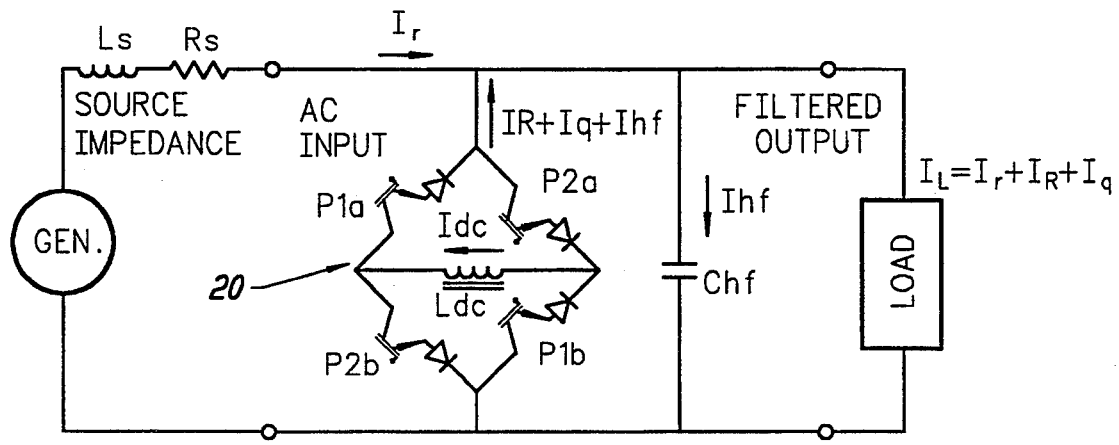
FIG. 1 is a parallel connected current source active filter in accordance with the prior art.
Figure 2:
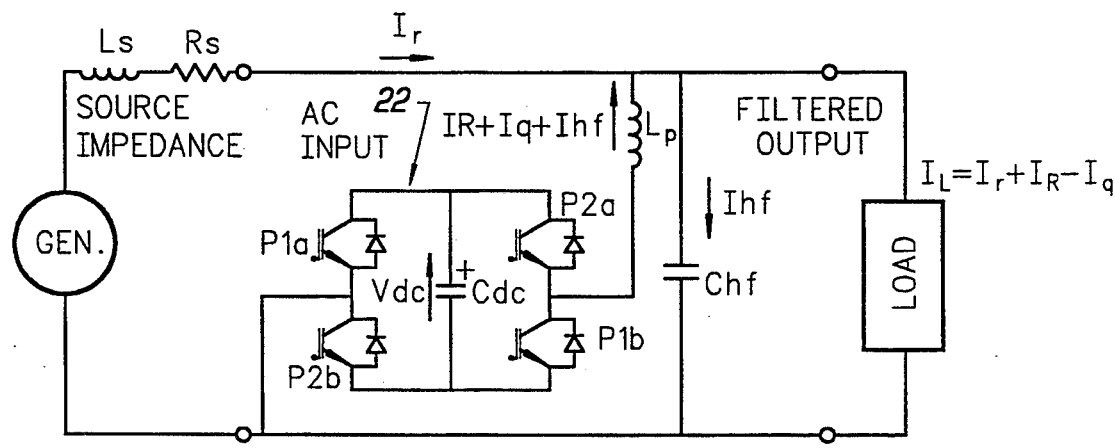
FIG. 2 is a parallel connected voltage source active filter in accordance with the prior art.
Figures 3, 4:
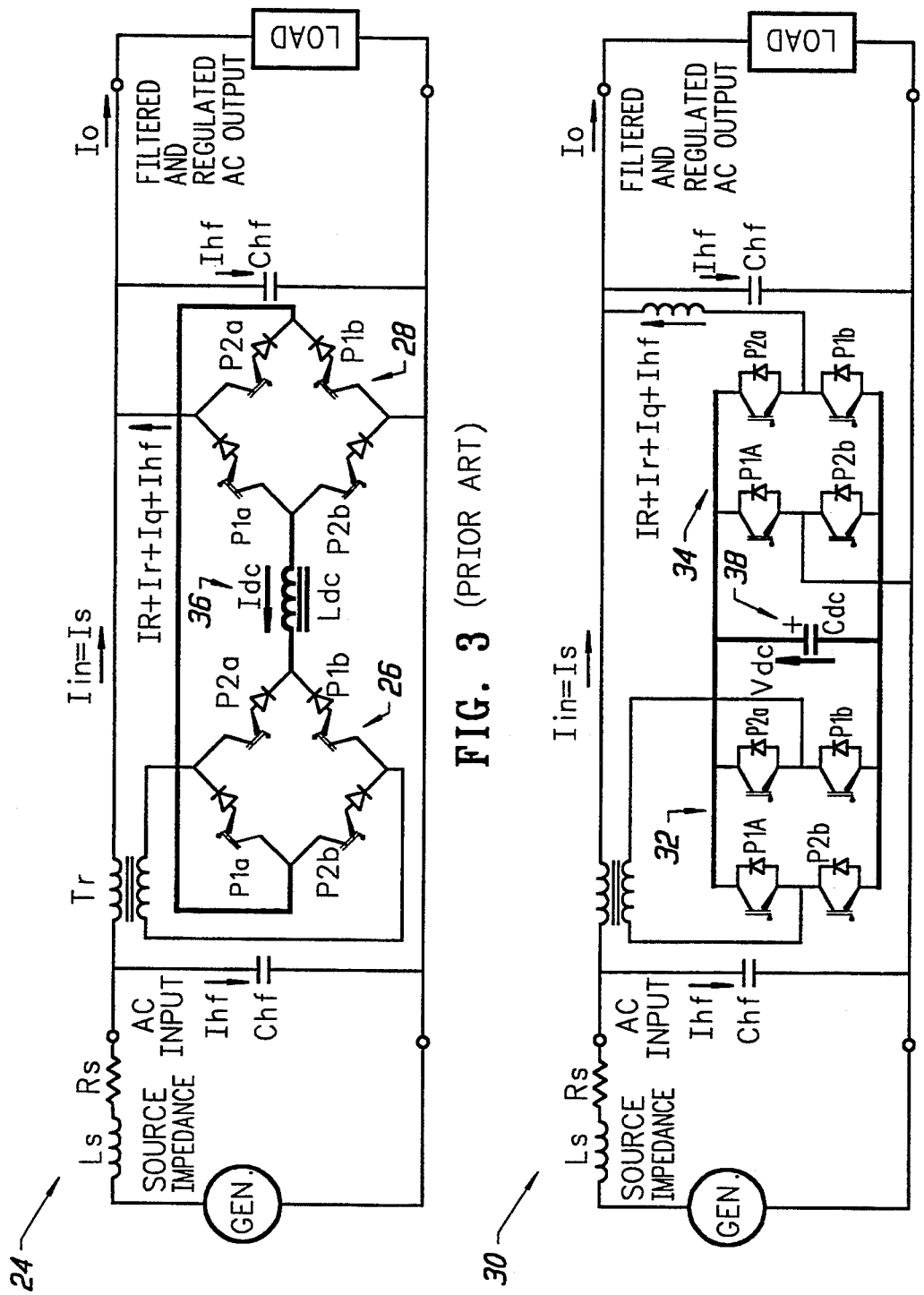
FIG. 3 is a shared link current source active power filter in accordance with the prior art.
FIG. 4 is a shared link voltage source active power filter in accordance with the prior art.
Figure 5:
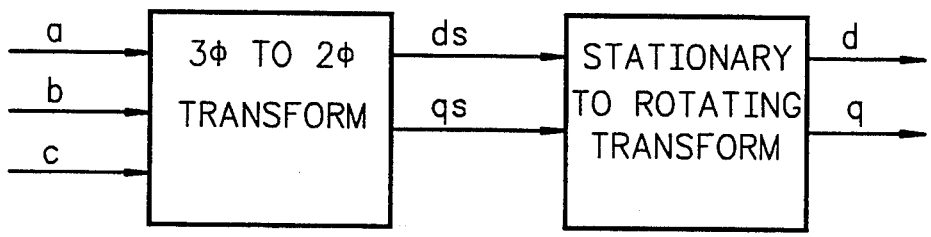
FIG. 5 is a symbolic representation of a field orientation control system and its corresponding mathematical model.
Figure 6:
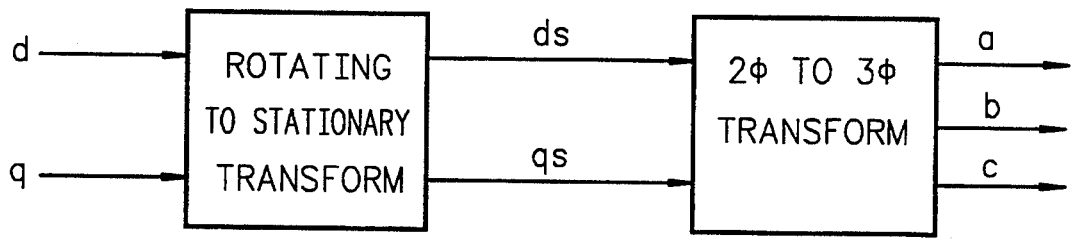
FIG. 6 is a symbolic representation of a field orientation control system and its corresponding mathematical model.
Figure 7:
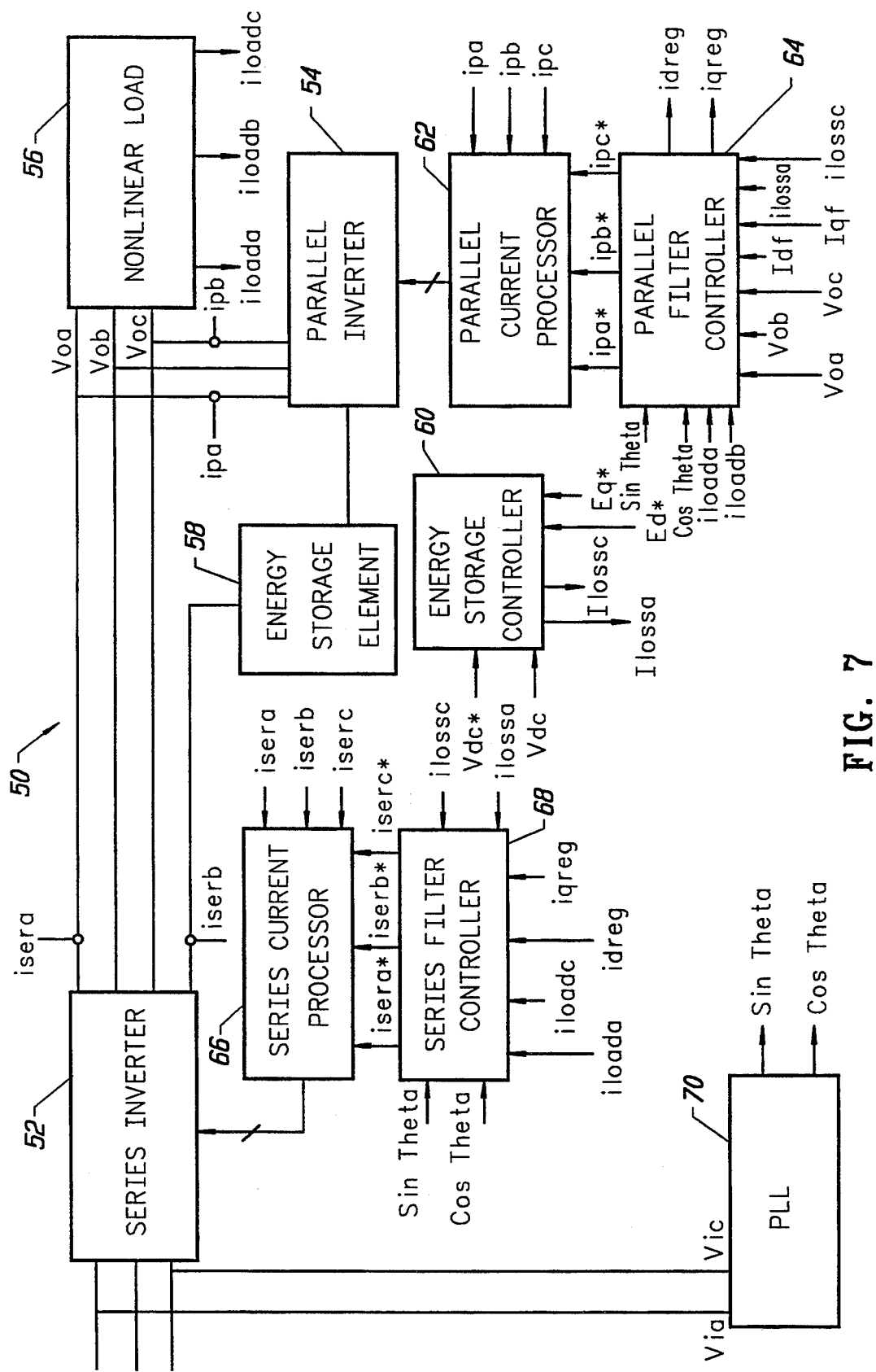
FIG. 7 is a block diagram depicting the interrelated elements of the field oriented series/parallel active power line conditioner of the invention.

FIG. 7 depicts the basic power circuit configuration for a three phase series-parallel active power line conditioner 50, in accordance with the invention. The conditioner 50 includes a series inverter 52 and a parallel inverter 54 which deliver conditioned power to a non-linear load 56. The series inverter 52 and the parallel inverter 54 are coupled by an energy storage element 58. The energy storage element 58 is controlled by an energy storage controller 60, in conjunction with the series inverter 52 and the parallel inverter 54.

The parallel inverter 54 receives its current from a parallel current processor 62 which is in turn coupled to a parallel filter controller 64. Analogously, the series inverter receives its current from a series current processor 66 which is coupled to a series filter controller 68. A phase locked loop circuit 70 provides input voltage phase angle information to the series filter controller 68 and the parallel filter controller 64.

Figure 8:
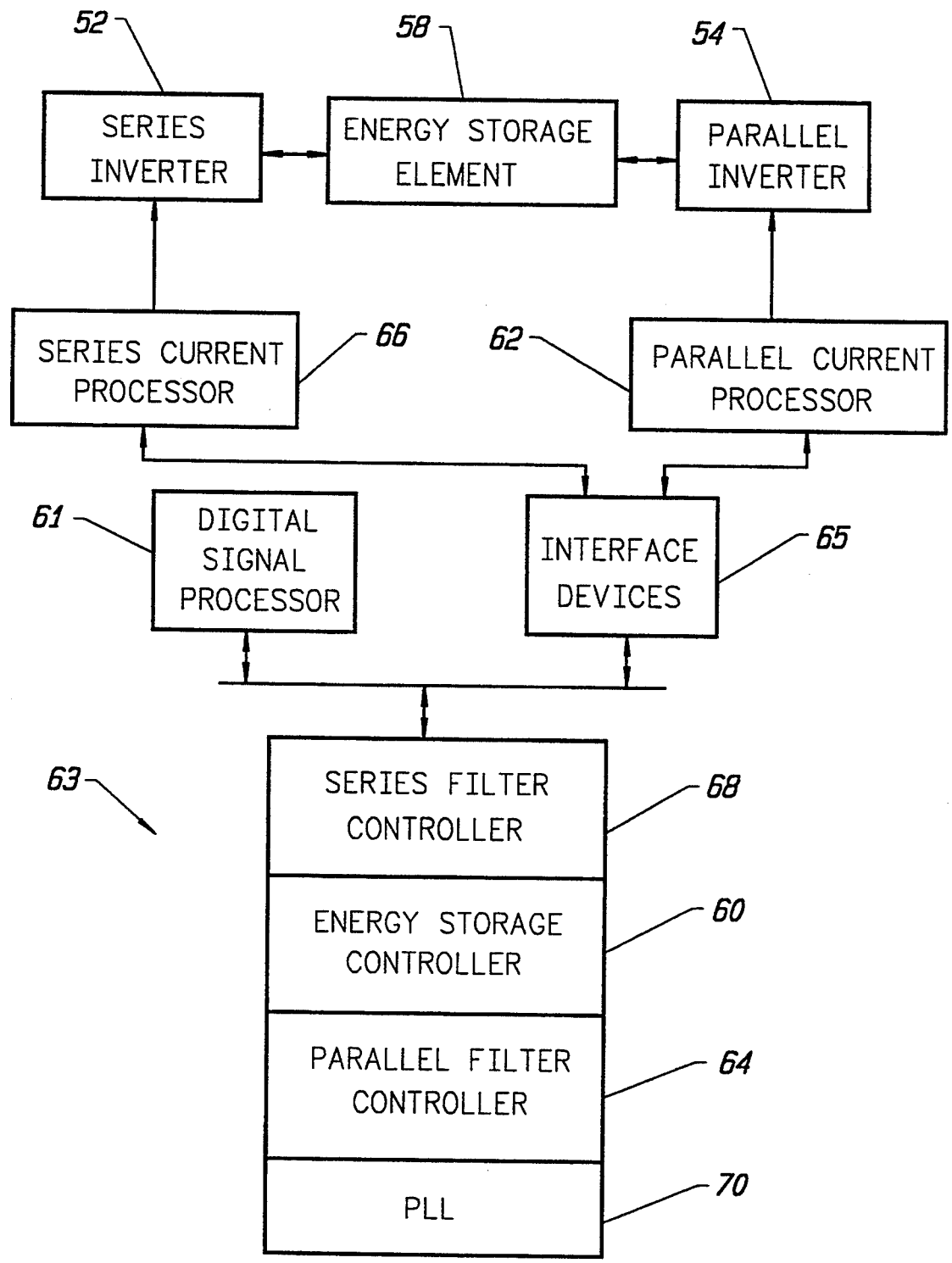
FIG. 8 is a block diagram corresponding to FIG. 7, but separately depicting the hardware and computer controlled elements of the invention.

FIG. 8 is a block diagram corresponding to FIG. 7, but separately depicting the hardware and computer controlled elements of the invention. In a preferred embodiment of the invention, a digital signal processor 61 is used in conjunction with a memory unit 63 to execute a number of control programs. The memory unit 63 may be RAM, ROM, disc storage, or any suitable combination of memory elements. The apparatus also includes interface devices 65 for providing analog/digital and digital/analog conversions between the digital signal processor 61 and the remaining analog elements. The interface devices module 65 also includes computer interface devices such as keyboards and monitors. The interactions between a digital signal processor 61, a memory unit 63, and interface devices 65 is known in the art.

The execution of the particular control programs of the invention will be described below. In particular, the series filter controller 68, the energy storage controller 60, the parallel filter controller 64, and the phase-locked loop 70, will be more fully described below, as will the remaining analog elements of the invention.

Figure 9:
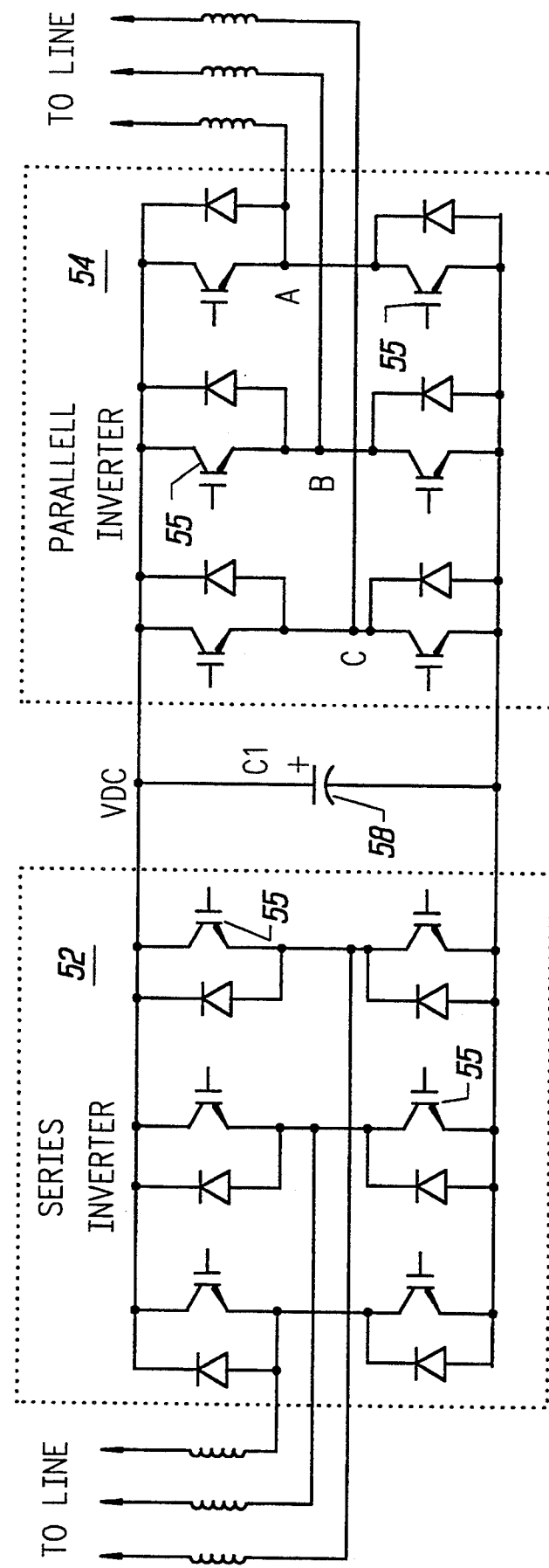
FIG. 9 is a detailed depiction of a series inverter, a parallel inverter, and energy storage element which may be used in accordance with the invention.

FIG. 9 is a more detailed depiction of some of the elements of the series-parallel active power line conditioner 50 of FIG. 7. The figure depicts a series inverter 52 and a parallel inverter 54. The depicted switching devices 55 in each inverter are insulated gate bipolar transistors (IGBTs); other power semiconductors, such as MOSFETs or bipolar transistors, may also be used. In this example, the energy storage element 58 necessary to supply or absorb instantaneous power for control of the output voltage and input current is a capacitor charged to a constant dc voltage.

The parallel inverter 54 is controlled to maintain distortion-free sinusoidal voltages ($V_{oa}$, $V_{ob}$, $V_{oc}$) across the output terminals. The currents which must be generated by the parallel filter 46 to accomplish this are equal and opposite to the harmonic components of the load currents.

The series inverter 52 is controlled to maintain sinusoidal source currents. The voltages generated by the series filter to accomplish this must be equal and opposite to the harmonic voltage distortion on the input. The series inverter 52 is also controlled to adjust the input current magnitude so as to regulate the output voltages.

Figure 10:
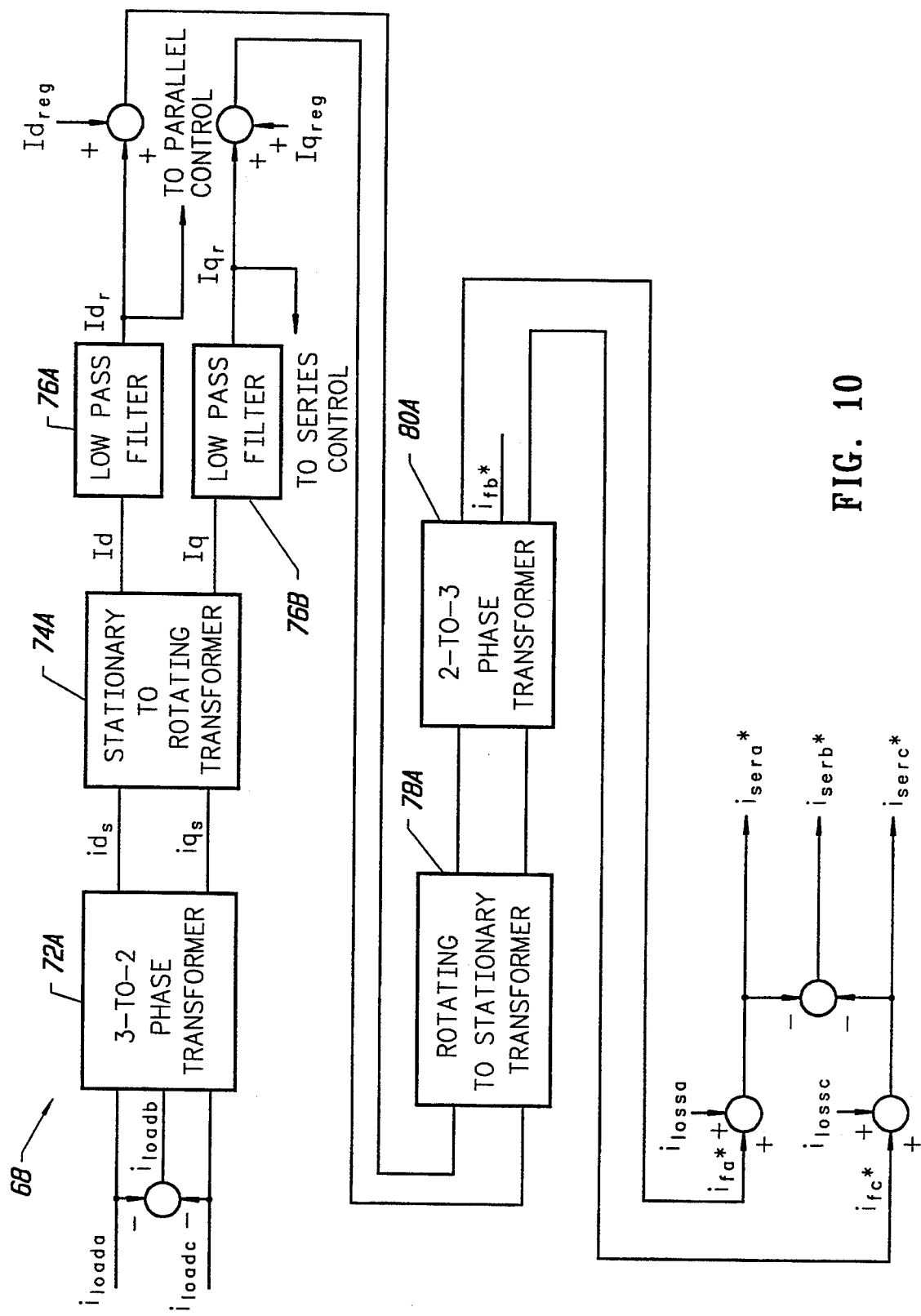
FIG. 10 is a detailed depiction of a series filter controller of the invention.

FIG. 10 is a more detailed depiction of the series filter controller 68 of the invention. The load currents, $i_{loada}$ and $i_{loadc}$ are sensed through conventional means and form the input to the series filter controller 68. The b phase load current signal, $i_{loadb}$, may be derived from the following equation: $i_{loadb} = -(i_{loada} + i_{loadc})$. The load phase currents, $i_{loada}$, $i_{loadb}$, and $i_{loadc}$ can be represented by vectors which are displaced by 120 degrees, where the magnitude of the vector is equal to the instantaneous value of the corresponding load current.

In accordance with the invention, the fundamental components of the individual signals are extracted by the series filter controller 68, and are used as feedforward current reference signals to the series filter inverter 52. This is accomplished by using synchronous transformation techniques.

Figure 11:
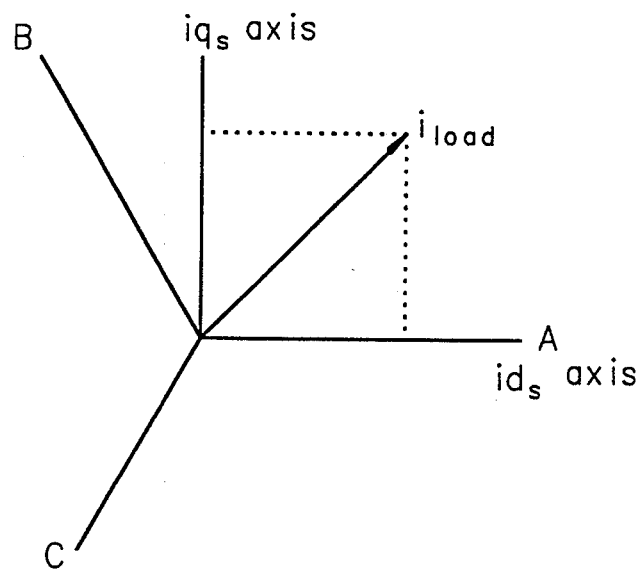
FIG. 11 depicts the 3-phase to 2-phase transformation, and its corresponding mathematical equations, associated with the 3-phase to 2-phase transformer of the invention.

Initially, a three phase-to-two phase transformer 72A is used to transform the three phase load currents into a single vector. This vector rotates at constant frequency with respect to a stationary reference frame, with axes labeled $i_{ds}$ and $i_{qs}$, as depicted in FIG. 11. In other words, the $i_{load}$ signal is a vector sum of the instantaneous load current, which comprises three phases a, b, and c, corresponding to the three axes in the figure.

Figure 12:
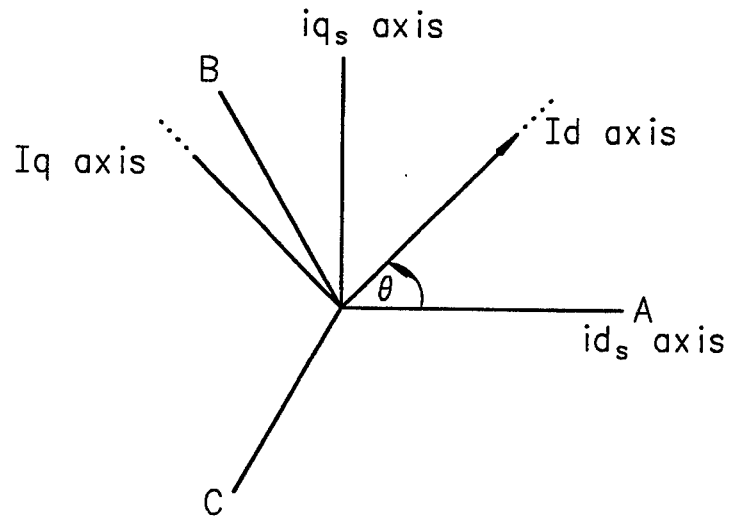
FIG. 12 depicts the stationary-to-rotating transformation, and its corresponding mathematical equations, associated with the stationary-to-rotating transformer of the invention.

Also shown in FIG. 11 are known equations which characterize a 3-phase to 2-phase transformation. The load current vector is resolved into $i_{ds}$ and $i_{qs}$ components, which are the input to a stationary-to-rotating transformer 74A. This transformation is illustrated in relation to FIG. 12. The axes labeled $I_d$ and $I_q$ rotate at the same frequency as the current vector. FIG. 12 also shows known equations which characterize the stationary-to-rotating reference frame transformation.

The rotating reference frame transformation requires measuring the angle Θ, which is the angle of the input voltage vector with respect to the stationary reference frame. This angle is measured using phase locked loop 70, which is described below.

In the rotating reference frame, the load current vector is composed of $I_d$ and $I_q$ signals which each consist of a dc component and a superimposed ac component. The dc components correspond to the fundamental of the load currents and the ac components correspond to the load current harmonics. Thus, the harmonics cause the magnitude and phase of the vector to vary as it rotates.

Returning to FIG. 10, the $I_d$ and $I_q$ signals from the stationary-to-rotating transformer 74 are processed by low pass filters 76A and 76B. Preferably, the low pass filters are finite impulse response low pass filters, which are known in the art. In such a filter, the output is determined by a convolution sum of the present input and N-1 previous inputs, where each input is multiplied by a filter coefficient. As each new sample is taken, the oldest sample is dropped out of the sum. A so-called "sliding window" filter as described in U.S. Pat. No. 4,811,236 may be substituted for the low pass filters 76A and/or 76B. This patent is expressly incorporated by reference herein.

The low pass filters 76 only pass the dc components, $I_{df}$ and $I_{qf}$, of the signals. These signals correspond to the fundamental frequency components of the load currents. The $I_{df}$ and $I_{qf}$ signals are used by the parallel filter controller 64, as will be described below. The same signals are also summed with regulating current signals $I_{dreg}$ and $I_{qreg}$, which act to regulate the fundamental output voltage. The derivation of the regulating current signals will be described below.

The inverse transformations to those performed above are performed by a rotating-to-stationary transformer 78A and a 2-to-3 phase transformer 80A. This results in the fundamental frequency current reference signals $i_{fa}*$, $i_{fbI}$, and $i_{fc}*$. The known inverse transformations are given by:

$$\begin{bmatrix} i_{ds}* \\ i_{qs}* \end{bmatrix} = \begin{bmatrix} \cos\theta & -\sin\theta \\ -\sin\theta & \cos\theta \end{bmatrix} \begin{bmatrix} I_d* \\ I_q* \end{bmatrix}$$

$$\begin{bmatrix} i_{fa}* \\ i_{fb}* \\ i_{fc}* \end{bmatrix} = \begin{bmatrix} 1 & 0 \\ -1/2 & \sqrt{3}/2 \\ -1/2 & -\sqrt{3}/2 \end{bmatrix} \begin{bmatrix} i_{df} + i_{dreg} \\ i_{qf} + i_{qreg} \end{bmatrix}$$

The resultant signals consist of the fundamental component of the load current summed with the fundamental signal required to regulate the output voltage.

Link restoration current signals $i_{lossa}$ and $i_{lossc}$ are then summed with the fundamental current references. The derivation of these signals is explained below. The link restoration current signals are sinusoidal current references necessary to maintain a constant dc link voltage for the series and parallel inverters. In other words, the link restoration current signals provide the necessary current to keep the dc link capacitor charged. These signals are necessary in view of the depletion of the capacitor voltage during inverter operation. In an alternate embodiment, the link restoration current signals may be summed in the rotating reference frame. In this case, signal $I_{dloss}$, is summed ($I_{dloss}$ is the output of the PI controller 120 in FIG. 17, which will be discussed below).

The summation of $i_f*$ and $i_{loss}$ current references results in the series inverter current reference signals, or current demand signals, $i_{scra}*$, and $i_{src}*$. The b phase current reference, $i_{serb}*$, is the negative of the sum of the a and c phase references. These signals are conveyed to series current processor 66.

Figure 13:
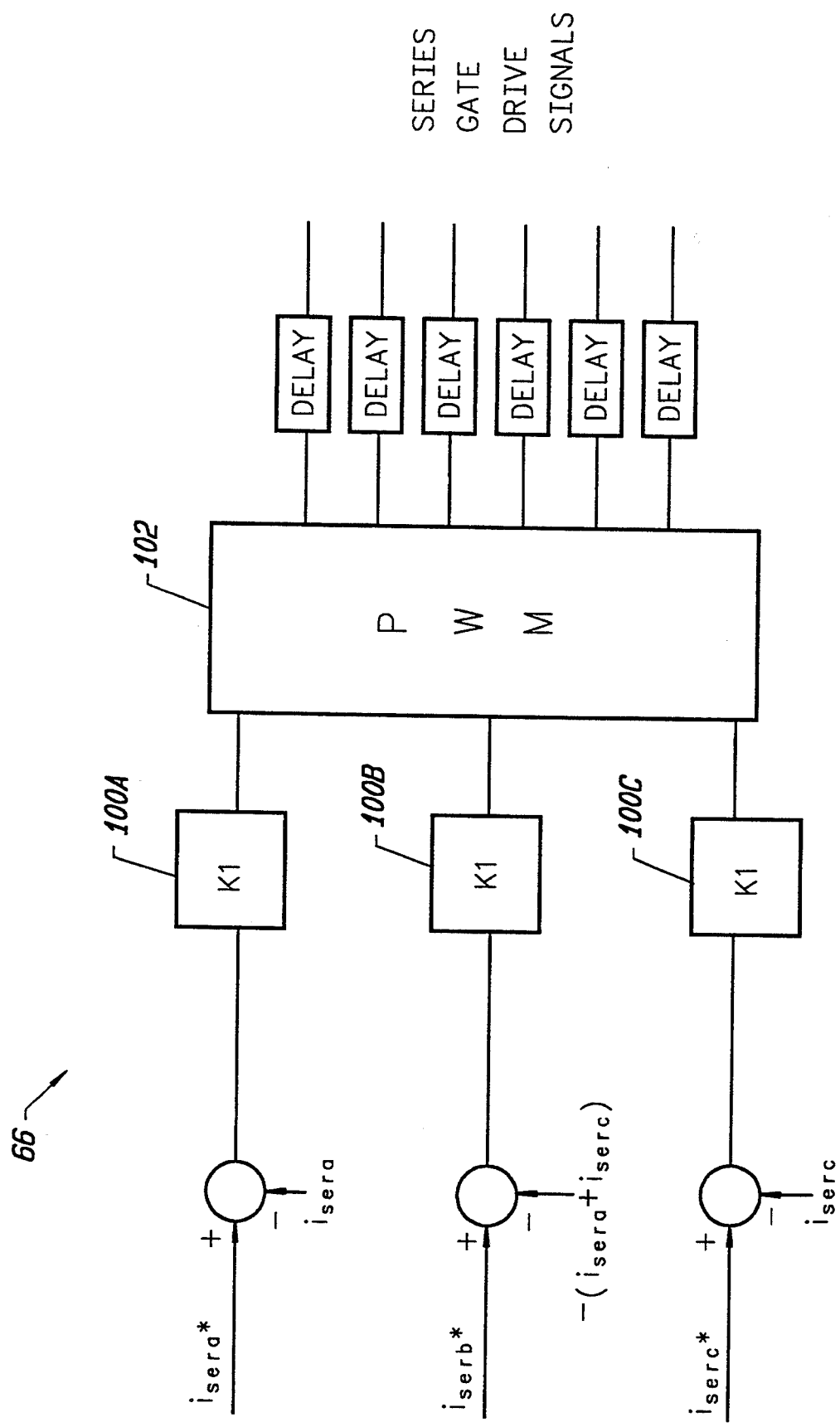
FIG. 13 is a detailed depiction of the series current processor of the invention.

FIG. 13 provides a detailed depiction of the series current processor 66. The previously established series inverter current reference signals are compared with the actual series inverter input current signals, $i_{scra}$, $i_{scrb}$, and $i_{serc}$, which are measured by conventional techniques. The b phase current is not measured directly, but is equal to $-(I_{scrra}+I_{src})$. The resulting error signals are amplified by proportional gain units 100A, 100B, and 100C. The outputs of the proportional gain units are applied to a pulse width modulator 102 which generates drive signals for the switching devices 52 in the series filter inverter 44.

In sum, the series filter controller 68 uses the fundamental component of the load current as a feedforward current reference signal. In other words, by deriving the fundamental component of the load current with synchronous transformations (3-to-2 phase transformer 72, stationary-to-rotating transformer 74, rotating-to-stationary transformer 78, and 2-to-3 phase transformer 80), the fundamental component may be used as a feedforward current reference signal which results in sinusoidal source currents. The feedforward load current signal also includes a regulating current to provide the necessary current to regulate the output voltage, and a link restoration current which provides the current necessary to keep the dc link capacitor charged.

Figure 14:
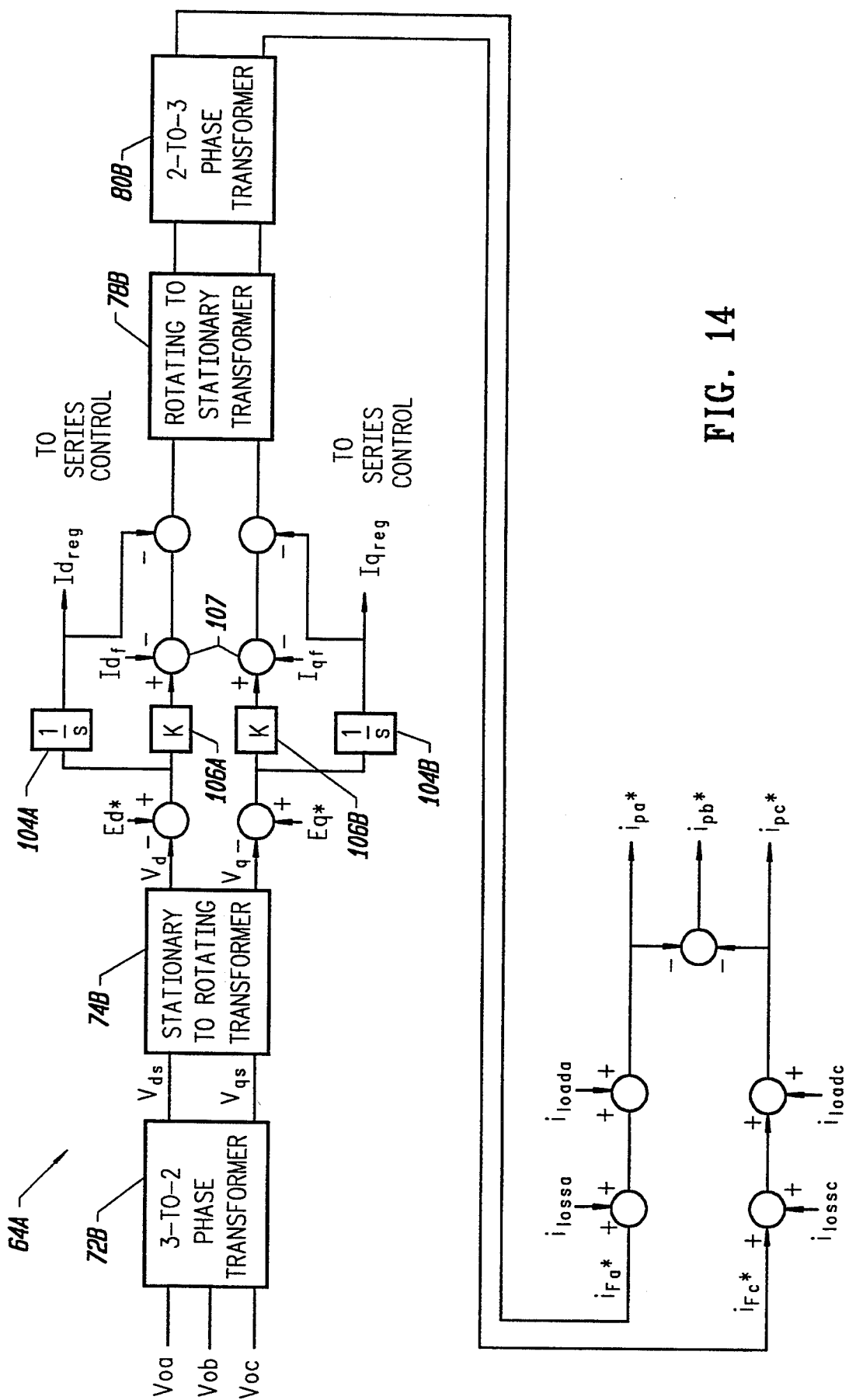
FIG. 14 is a detailed depiction of a parallel filter controller of the invention.

FIG. 14 depicts a control block diagram for the parallel filter controller 64A of the invention. The parallel filter controller forces the output voltages to be sinusoidal. This is accomplished by deriving the harmonic portion of the load current and using it as a feedforward signal. The harmonic feedforward signal circulates between the parallel filter and the load, therefore only the fundamental component of the load current flows from the source.

The signals processed by the control loop are the output voltages $v_{oa}$, $v_{ob}$, and $v_{oc}$. The 3-phase to 2-phase transformer 72B and the stationary-to-rotating transformer 74B produce a rotating output voltage vector and a synchronously rotating reference frame in the manner described above. In the rotating reference frame, the output voltage fundamental components are transformed into a constant (dc) value. Harmonics present in the output voltages result in an ac ripple superimposed on the dc component. The output voltage vector is compared with constant $E_d*$, and $E_q*$ values. $E_d*$ and $E_q*$ are the output voltage reference signals which represent the desired magnitude and phase of the output voltages. Thus, $E_q*$ is equal to zero if the input and output voltages are to be in phase, which is the usual case. This in phase condition is maintained by phase-locked loop 70, which will be described below. $E_{d*}$ is set to a value corresponding to the desired magnitude of the output voltages.

The resulting error signals are respectively integrated by integrators 104A and 104B. The integrated error signals, $Id_{reg}$ and $Iq_{reg}$, are applied to the series filter controller 68, as described above. Due to the high dc gain provided by the integrators 104A and 104B, the series filter current references will adjust to the value required to maintain the output fundamental voltages at the desired amplitude, as set by $E_{d*}$ and $E_{q*}$.

The remaining ac ripple components of the error signals, corresponding to harmonics present in the output voltages, are amplified by proportional gain devices 106A and 106B. The fundamental load current signals, $I_{df}$ and $I_{gf}$, are subtracted from the output of the proportional gain devices by mixers 107 to generate an intermediate reference signal. Since this reference signal includes a value equal and opposite to the fundamental load current, when this reference signal is latter combined with the actual load current, the resultant signal will be the harmonics of the load current. The $I_{df}$ and $I_{qf}$ signals are obtained from the series filter controller 68, as previously described. $I_{dreg}$ and $I_{qreg}$ are summed with the intermediate reference signals so that power balance is maintained between the series and parallel elements.

The intermediate reference signal is then processed by the rotating-to-stationary transformer 78B and the 2-to-3 phase transformer 80B to produce time domain intermediate reference signals $i_{fa*}$ and $i_{fc*}$. The link restoration signals, $i_{lossa}$ and $i_{lossc}$, are added to $i_{fa*}$ and $i_{fc*}$. As in the case of the series controller 68, the link restoration signals are sinusoidal current references necessary to maintain a constant dc link voltage for the series and parallel inverters. Alternately, the link restoration signal $I_{dloss}$ may be summed in the rotating reference frame.

The actual load current feedback signals, $I_{loada}$ and $i_{loadc}$, are then added to the signal. The actual load currents minus the fundamental components of the load currents (provided when $I_{df}$ and $I_{qf}$ were subtracted by mixers 107) equals the load harmonic currents ($i_{pa*}$, $i_{pb*}$, $i_{pc*}$). The load harmonic currents are applied to the parallel current processor 62A as load harmonic current feedforward references.

Figure 15:
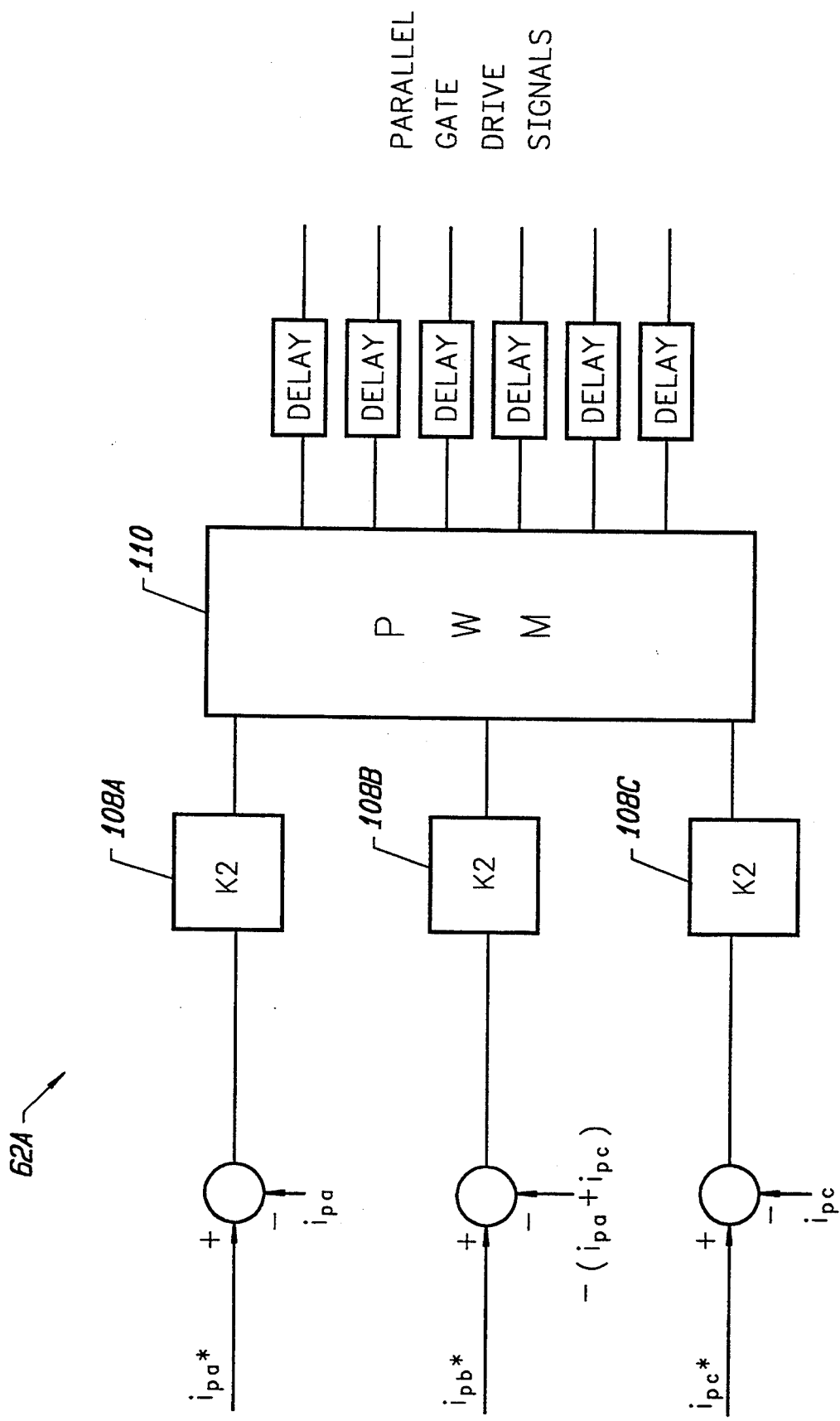
FIG. 15 is a detailed depiction of a parallel current processor of the invention.

FIG. 15 depicts the parallel current processor 62A. The load harmonic currents ($i_{p*}$, $i_{pb*}$, $i_{pc*}$) are compared with the parallel inverter feedback signals, $i_{pa}$, $i_{pc}$, and $i_{pb}$ which is established by the equation $i_{pb} = -(i_{pa}+i_{pc})$. The resulting error signals are amplified by proportional gain devices 108A, 108B, and 108C, and are then applied to the pulse width modulator 110, which generates the drive signals for the switching devices 55 in the parallel inverter 54.

Thus, load current harmonics are used to compensate the inverter signals to render a harmonic-free current signal which results in distortion-free sinusoidal voltages at the output terminals. At the same time, the current signal includes a component to maintain the energy level of the dc link.

The parallel filter controller 64 eliminates the need for the harmonic current references to be developed by an output voltage error signal. Thus the compensation capability of the parallel filter is improved. The output voltage harmonic error signal is then used only to force the output voltage to be sinusoidal.

Figure 16:
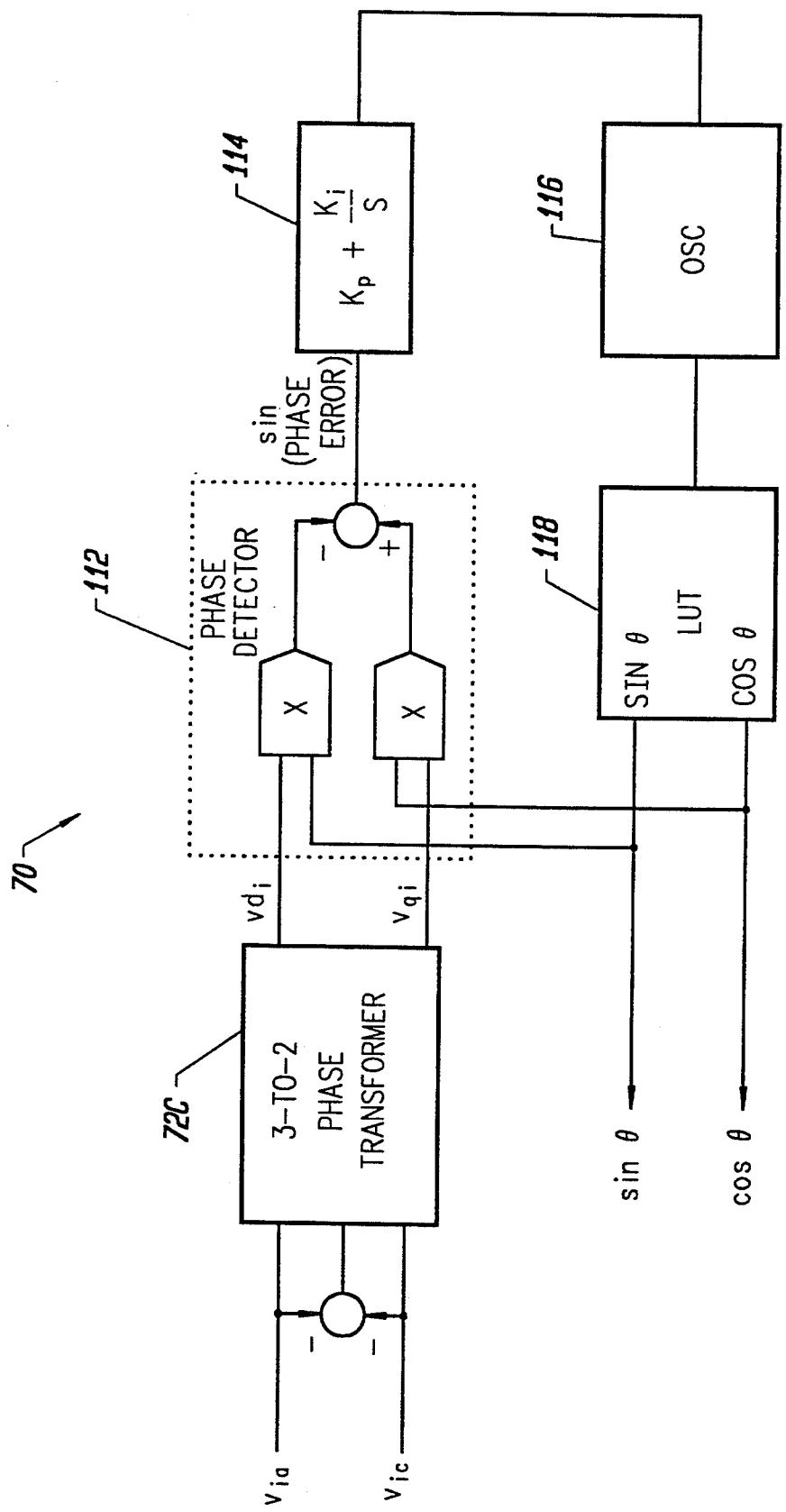
FIG. 16 is a depiction of a phase locked loop which may be used in accordance with the invention.

The stationary-to-rotating transformer 74 and rotating-to-stationary transformer 78 require determination of $\sin \Theta$ and $\cos \Theta$, where $\Theta$ is the angle of the input vector with respect to the stationary reference frame. A vector phase-locked loop 70, as shown in FIG. 16, may be used to determine $\sin \Theta$ and $\cos \Theta$. An instantaneous vector sum of the input voltages, provided by a 3-to-2 phase transformer 72C, results in signals $v_{di}$ and $v_{qi}$. These signals are conveyed to a phase detector 112. The phase detector output is given by:

$$\sin(\text{phase error}) = v_{di} * \cos\Theta - v_{qi} * \sin\Theta$$

In the equation, $\sin\Theta$ and $\cos\Theta$ are the values presently pointed to in a look-up table.

The phase detector output 112 is processed by a proportional plus integral (PI) controller 114 which provides fast response and zero steady-state tracking error. The PI controller 114 output is used to determine the count parameter of a timer or digital oscillator 116. The timer count value is decremented from the count parameter value at a constant rate, when zero is reached the $\sin \Theta$ and $\cos \Theta$ pointers in the look-up table are incremented.

Since this is a closed-loop system, the timer count value is either increased or decreased, depending on the PI controller 114 output, so as to reduce the phase error until a phase-locked condition is achieved.

Figure 17:
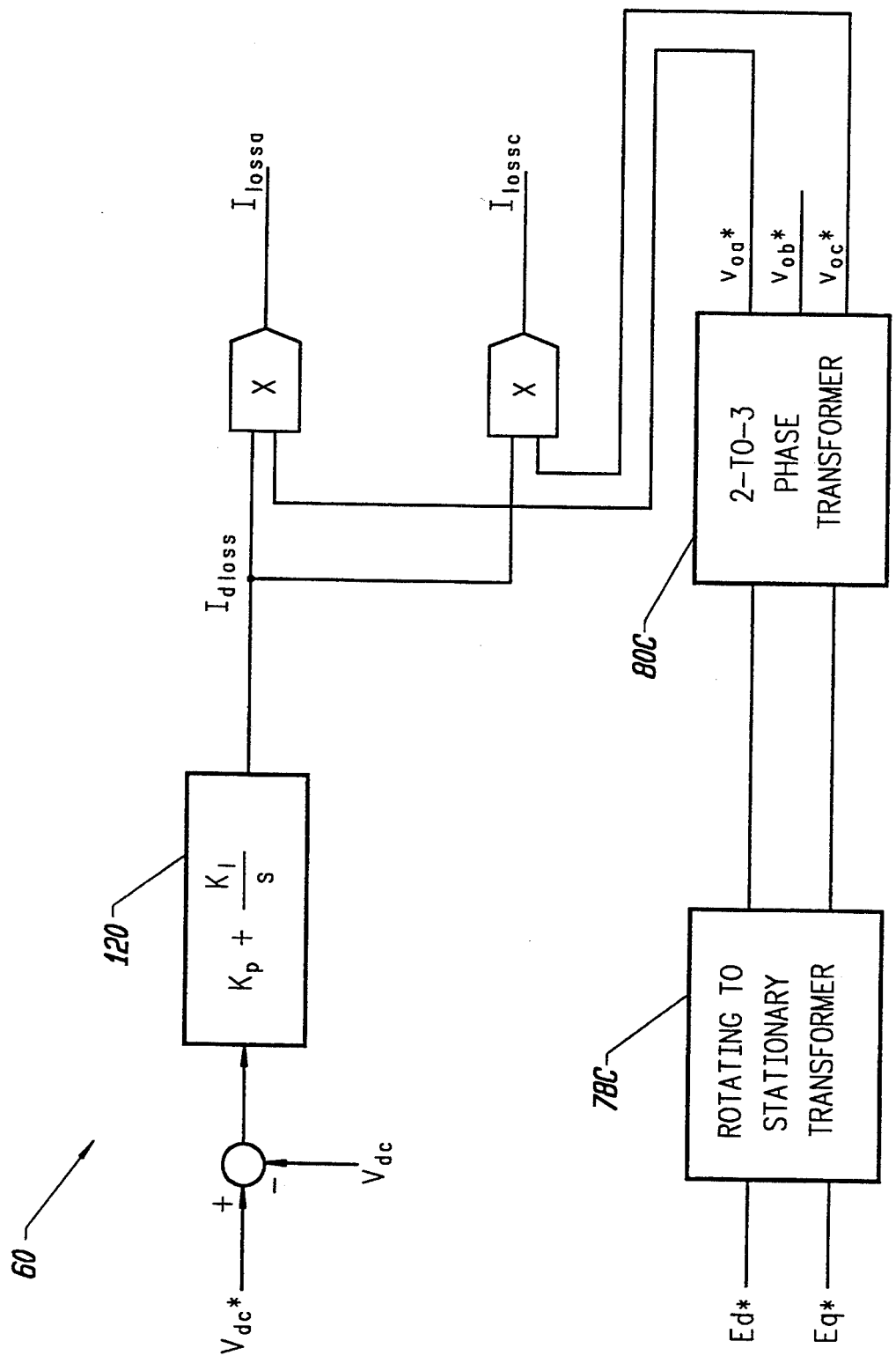
FIG. 17 is a detailed depiction of the energy storage controller of the invention.

The energy storage controller 60 which may be used in the invention is shown in FIG. 17. The energy storage controller 60 generates the link restoration current signals $i_{lossa}$ and $i_{lossb}$ used by the series filter controller 68 and the parallel filter controller 64.

The dc link voltage reference, $V_{dc*}$, is compared with the actual dc link voltage. The resultant error signal is processed by a PI controller 120. The resultant signal includes a ripple component corresponding to an error in the dc link voltage. This signal is multiplied by the instantaneous output voltage reference signals, $v_{oa*}$ and $v_{oc*}$, to generate the link restoration current signals $I_{lossa}$ and $I_{lossc}$ (or $I_{dloss}$ is summed directly in the rotating reference frames).

The instantaneous output voltage reference signals ($V_{oa*}$, $V_{ob*}$, $V_{oc*}$) are derived by the rotating-to-stationary transformer 78C and the 2-to-3 phase transformer 80C operating on the signals $E_{d*}$ and $E_{q*}$. As previously discussed, the relative magnitudes of $E_{q*}$ and $E_{d*}$ represent the phase between the input and output voltages. Normally, $Eq*$ is set to zero if the input and output are to be in phase. $E_{d*}$ is set to a value corresponding to the desired magnitude of the output voltages. $E_{d*}$ and $E_{q*}$ are rotating reference frames, which when transformed by rotating-to-stationary transformer 78 and 2-to-3 phase transformer 80 to a time domain three phase value, results in a sinusoidal reference corresponding to the desired output voltage.

In sum, the energy storage controller 60 is multiplying a dc error signal with a sinusoidal signal which is in phase with the output voltage. The product of these signals results in the link restoration current signals which provide energy transfer from the energy source to compensate for energy losses in the energy storage element 58.

Figure 18:
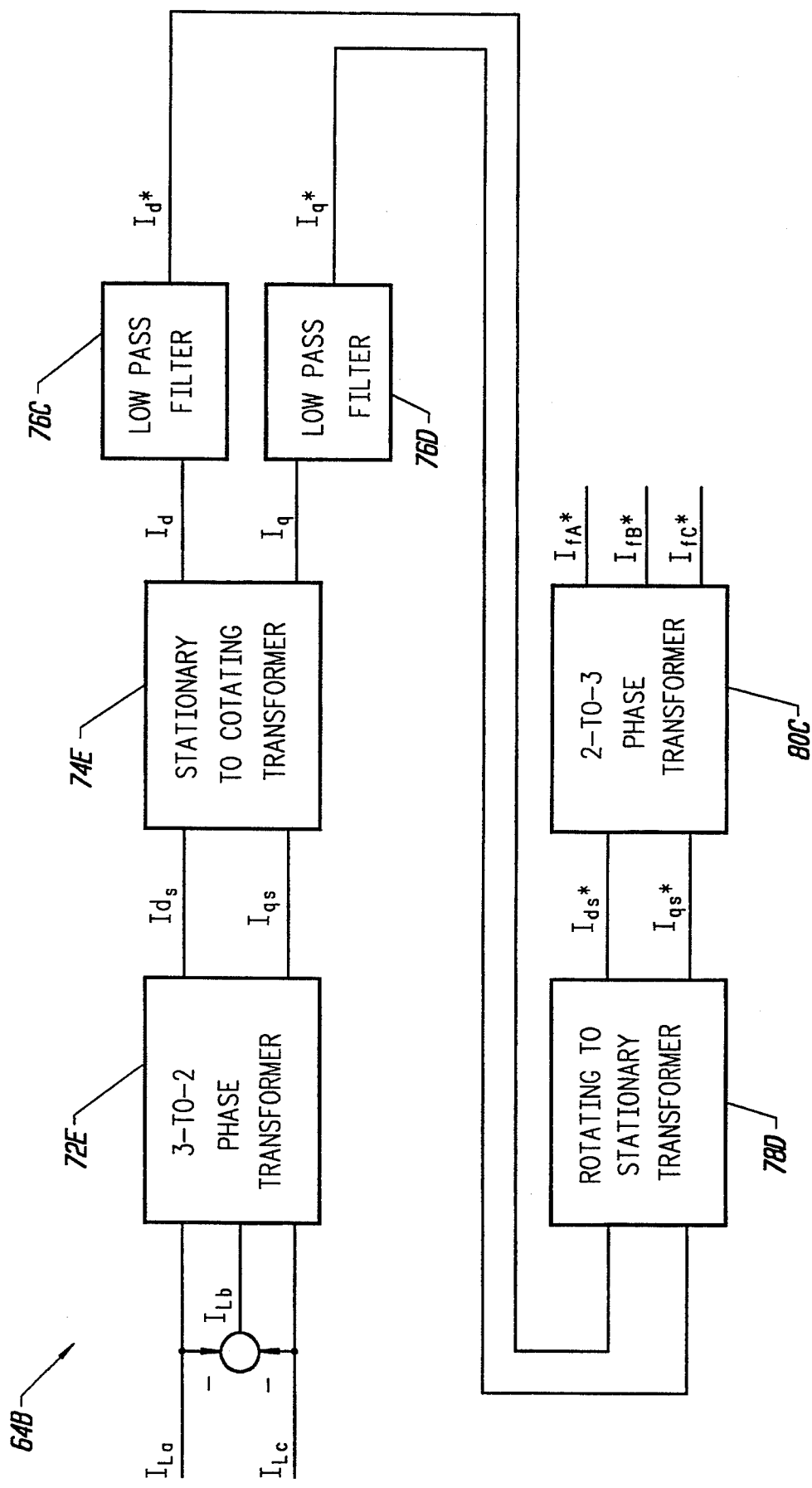
FIG. 18 is an alternate embodiment of the parallel filter controller of the invention.

Alternate embodiments within the scope of the invention will be readily recognizable by those skilled in the art. FIG. 18 depicts an alternate parallel filter controller 64B in accordance with the invention. The parallel filter controller 64A of FIG. 14 processes the output voltages ($v_{oa}$, $v_{ob}$, $v_{oc}$), the parallel filter controller 64B of FIG. 18 processes the three-phase load current feedback signals $I_{La}$, $I_{Lb}$, and $I_{Lc}$. A 3-to-2 phase transformer 72E is used to resolve the load currents into a single vector. As described above, the vector rotates at constant frequency with respect to a stationary reference frame, with axes labeled $d_s$ and $q_s$. A stationary-to-rotating transformer 74E is then used. This produces a transformation where the reference frame, with axes labeled d and q, rotates at the same frequency as the current vector, as described above. The rotating transformer 74E requires the line voltage vector Θ, which is produced by phase-locked loop 70. In the rotating reference frame, the load current vector is composed of $I_d$ and $I_q$ signals which each consist of a dc or constant component with a superimposed ac component. The dc component corresponds to the positive sequence fundamental load currents and the ac component corresponds to the load harmonic and negative sequence fundamental currents.

Figure 19:
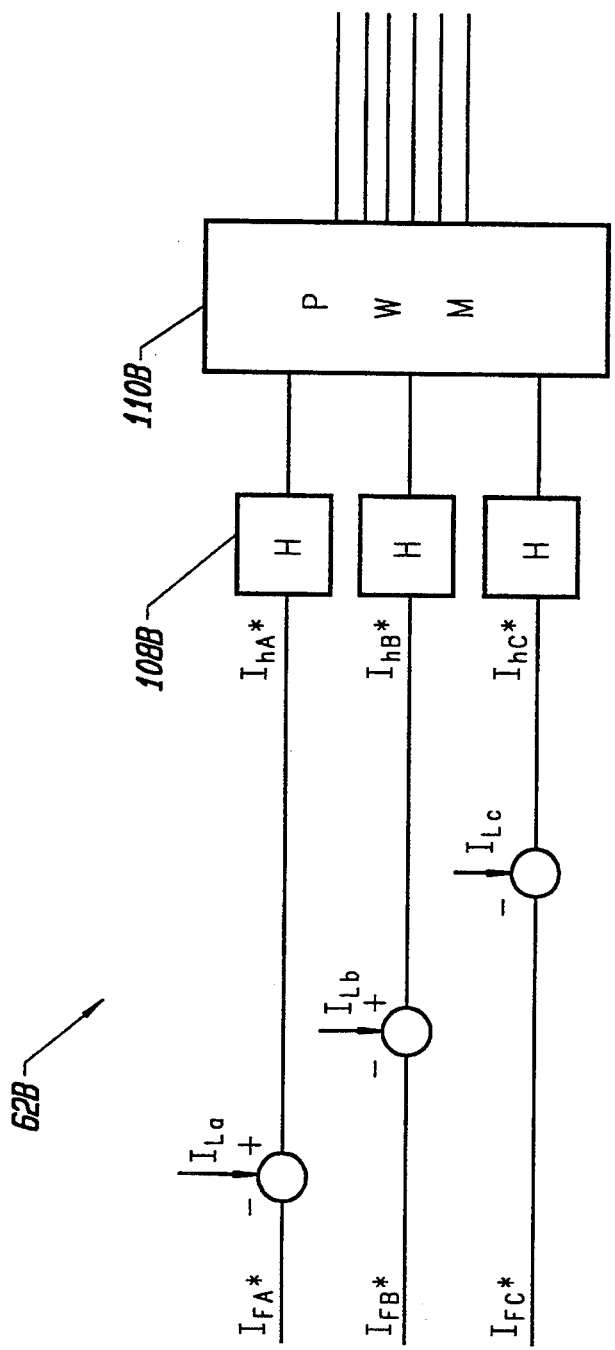
FIG. 19 is an alternate embodiment of the parallel current processor of the invention.

The $I_d$ and $I_q$ signals are then conveyed to low pass filters 76C and 76D so that only the dc components, corresponding to the fundamental load currents, are passed. The low pass filters 76C and 76D may be finite impulse response filters, as previously described. The fundamental load currents $I_{d*}$ and $I_{q*}$ are then subjected to inverse operations by a rotating-to-stationary transformer 78D and a 2-to-3 phase transformer 80C. The resultant three phase fundamental current signals ($I_{fa*}$, $I_{fb*}$, and $I_{fc*}$) are then conveyed to a parallel current processor 62B, as shown in FIG. 19. At the parallel current processor, the three phase fundamental current signals are subtracted from the instantaneous load currents to generate feedforward current reference signals ($I_{ha*}$, $I_{hb*}$, $I_{hc*}$), which are equivalent to the harmonic ripple components of the load current. These harmonic ripple components are applied to proportional gain elements 108B, and then to a pulse width modulator 110B. Thus, the locally generated harmonic load currents circulate between the parallel filter and the load, allowing the fundamental component of load current to flow from the source.

Figure 20:
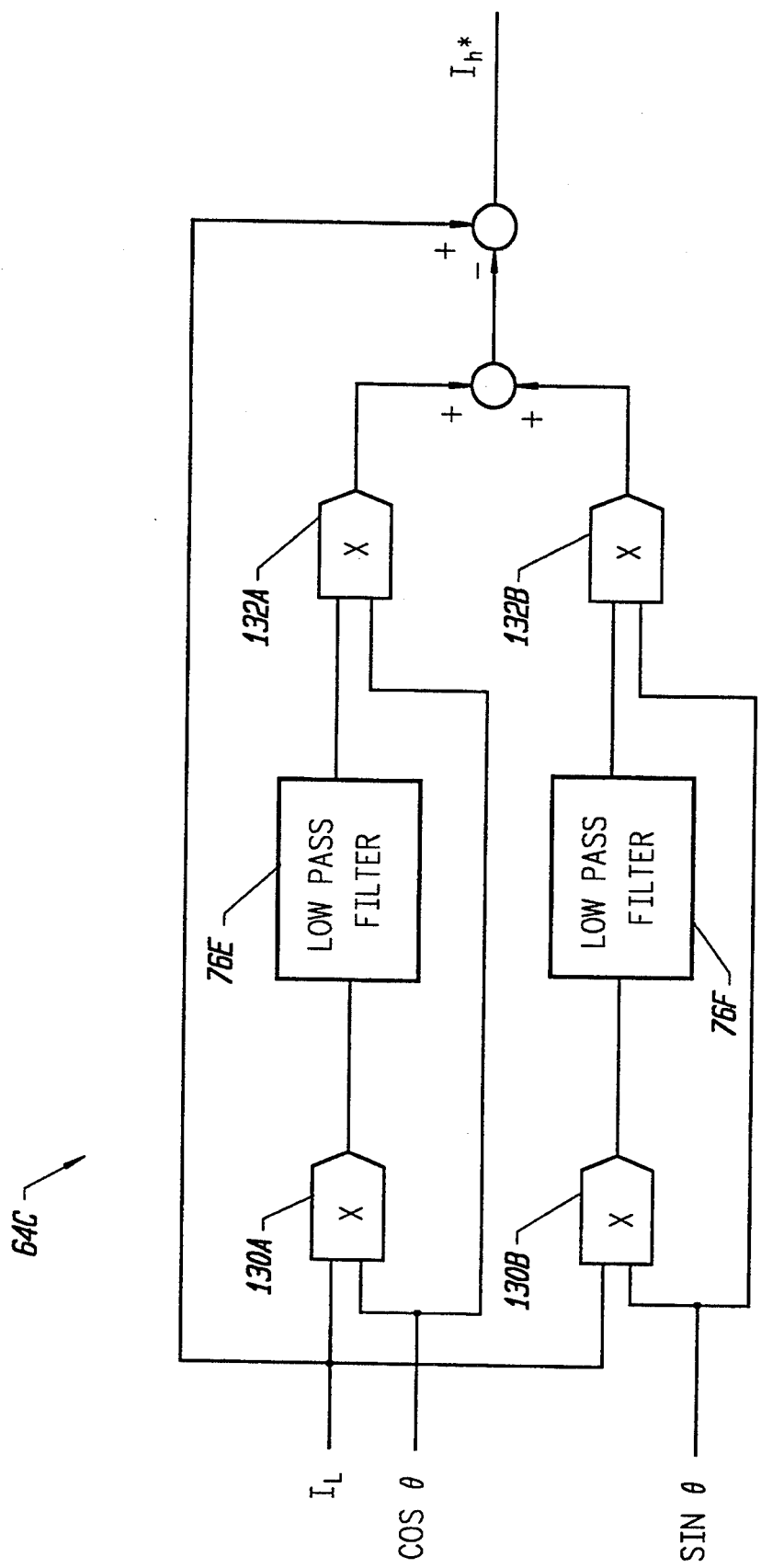
FIG. 20 is a single phase embodiment of the parallel filter controller of the invention.

The principles of the present invention may also be applied to a single phase apparatus. FIG. 20 depicts a single phase parallel filter controller 64C in accordance with the invention. The load current $I_L$ is applied to a set of multipliers 130A and 130B. The multipliers multiply the load current by the output of a phase-locked loop which is locked to the output voltage (cos Θ) and a derived signal which is phase shifted by 90° (sin Θ). One multiplier 130A receives the cos Θ input value, while the other multiplier 130B receives the sin Θ input value. In other words, in this embodiment, output voltage values are processed; in the synchronous transformation embodiments discussed above, the angle between the input voltage vector and the stationary reference frame was processed.

Multiplication of the phase of the output voltage signals by the load current transforms the load current into real and reactive current signals which both contain a dc component and a superimposed ac component. The dc components correspond to the fundamental real and reactive components of the load current. The ac component is an unwanted 120 Hz signal and a superimposed ripple component which corresponds to the load harmonic current. The dc components of these signals are recovered using low pass filters 76E and 76F of the type previously described.

Another set of multipliers 132A and 132B are used to generate signals representing the actual instantaneous fundamental load active and reactive current. In particular, the multipliers are used to multiply the output from the dc low pass filters by the phase of the output voltage reference signals. The sum of these products results in the instantaneous fundamental load current. Subtraction of the fundamental load current from the actual load current results in the harmonic ripple component of the load current. This signal is then used as the feedforward signal, $I_{h*}$, in a manner as previously described.

Thus, as in the three-phase case described above, a transformation is performed in which the fundamental of the load current is represented by a dc or constant component, allowing recovery by low pass, or other, filtering. Then, an inverse transformation results in the instantaneous fundamental load current. Subtraction of this signal from the instantaneous load current results in the harmonic ripple feedforward signal.

As previously indicated, it is highly desirable to force balanced line voltages on the output side of a series inverter within an APLC. In other words, it is highly desirable to provide a series filter which cancels the negative sequence fundamental voltage present at the input of a series inverter. In the case of a parallel inverter, it is highly desirable to force balanced source currents on the input side of the inverter. Therefore, the parallel inverter must supply the negative sequence fundamental load current. A combination series-parallel APLC must do both, so that the output voltages and input currents are balanced.

Attention presently turns to alternate embodiments of the invention wherein the negative sequence fundamental input voltage and negative sequence fundamental load current are identified and used to improve power conditioning. In accordance with the invention, a series filter controller is provided which cancels the negative sequence fundamental voltage present at the input of the series inverter. Also, a parallel filter controller is provided which supplies the negative sequence fundamental load current.

Figure 21:
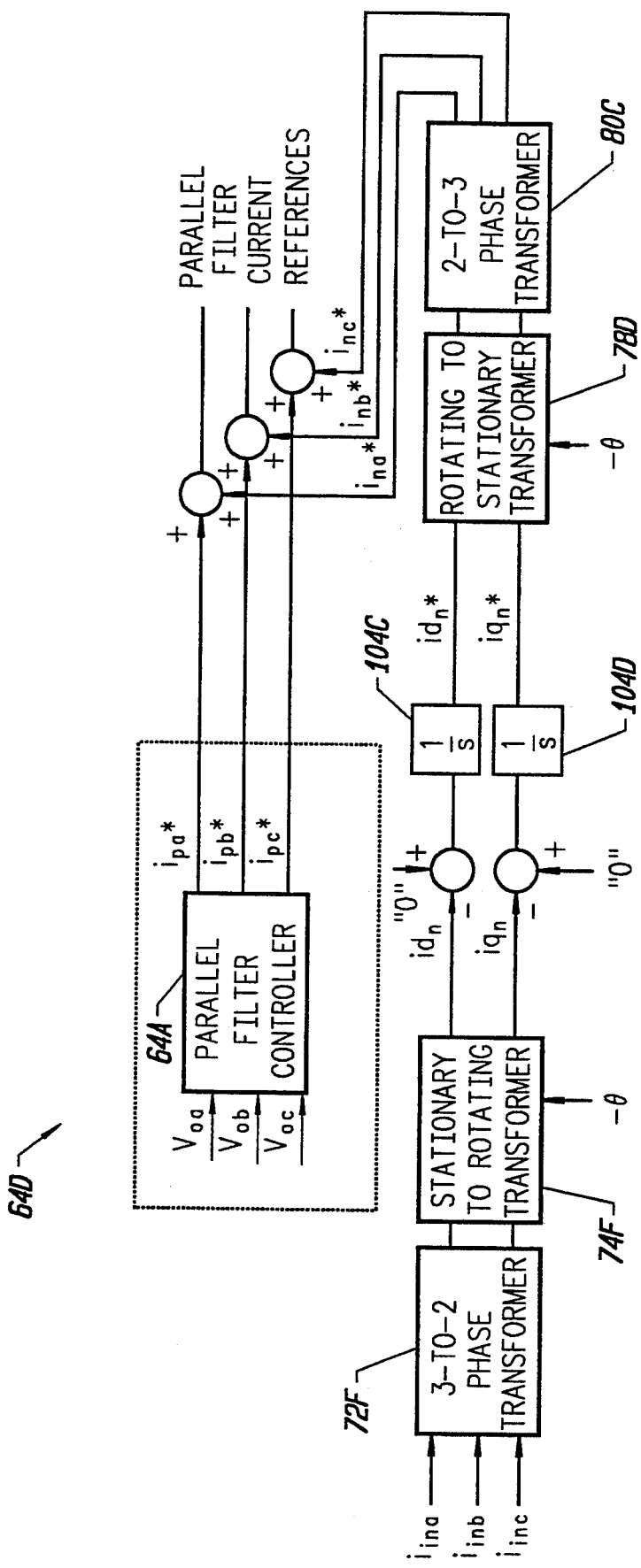
FIG. 21 is an apparatus for compensating for a negative sequence fundamental component within a source current.

FIG. 21 depicts a parallel filter controller 64D in accordance with the present invention. The parallel filter controller may include a parallel filter controller 64A of the type described in relation to FIG. 14, or an analogous parallel filter controller. In either event, current reference signals $i_{pa*}$, $i_{pb*}$, and $i_{pc*}$ are developed to force the inverter to generate the required load harmonic currents. The parallel filter controller 64D of FIG. 21 further processes the current reference signals so that the input source currents are also balanced. To accomplish this, the input currents $i_{ina}$, $i_{inb}$, and $i_{inc}$ are sensed by conventional means and the input current unbalance is detected using a rotating reference frame locked to the negative sequence fundamental.

As indicated in FIG. 21, the rotating reference frame includes a 3-to-2 phase transformer 72F for processing the input currents. As previously described, the 3-to-2 phase transformer 72F, which is an instantaneous vector sum of the input currents, resolves the load currents into a single vector. This vector rotates at constant frequency with respect to a stationary reference frame. The output of the 3-to-2 phase transformer 72F is conveyed to a stationary-to-rotating transformer 74F which yields signals corresponding to the negative sequence in the input currents. In other words, constant dc values corresponding to the direct and quadrature components ($i_{dn}$, $i_{qn}$) of the three-phase input current are produced.

As shown in FIG. 21, the stationary-to-rotating transformer 74F receives the angle $-\Theta$, which is the angle of the negative sequence line voltage vector. This angle may be measured using a phase-locked loop of the type described in relation to FIG. 16, with appropriate modification of the look up table 118 to yield $\sin -\Theta$, instead of $\sin \Theta$.

The objective of the parallel filter controller 64D of FIG. 21 is to modify the inverter current references so that the fundamental negative sequence is reduced to zero. This may be done by comparing the $i_{dn}$ and $i_{qn}$ signals with references corresponding to the desired fundamental negative sequence, which in this case is equal to zero. The error signals, $-i_{dn}$ and $-i_{qn}$, are processed by integrators 104C and 104D which provide high gain. Inverse transformations, first by rotating to stationary transformer 78D and then by 2-to-3 phase transformer 80C result in the inverter current references, $i_{na*}$, $i_{nb*}$, and $i_{nc*}$, required to eliminate the unbalance present in the input current.

The modified parallel filter inverter references are derived by summing the corresponding $i_{p*}$ and $i_{n*}$ references for each phase. These signals are conveyed to a parallel current processor 62 and then to the parallel inverter 54. In sum, the parallel filter controller 64D generates the required load negative sequence fundamental and harmonic currents. Since the negative sequence fundamental currents are now being generated, the parallel filter component ratings and energy storage must be sized accordingly.

Figure 22:
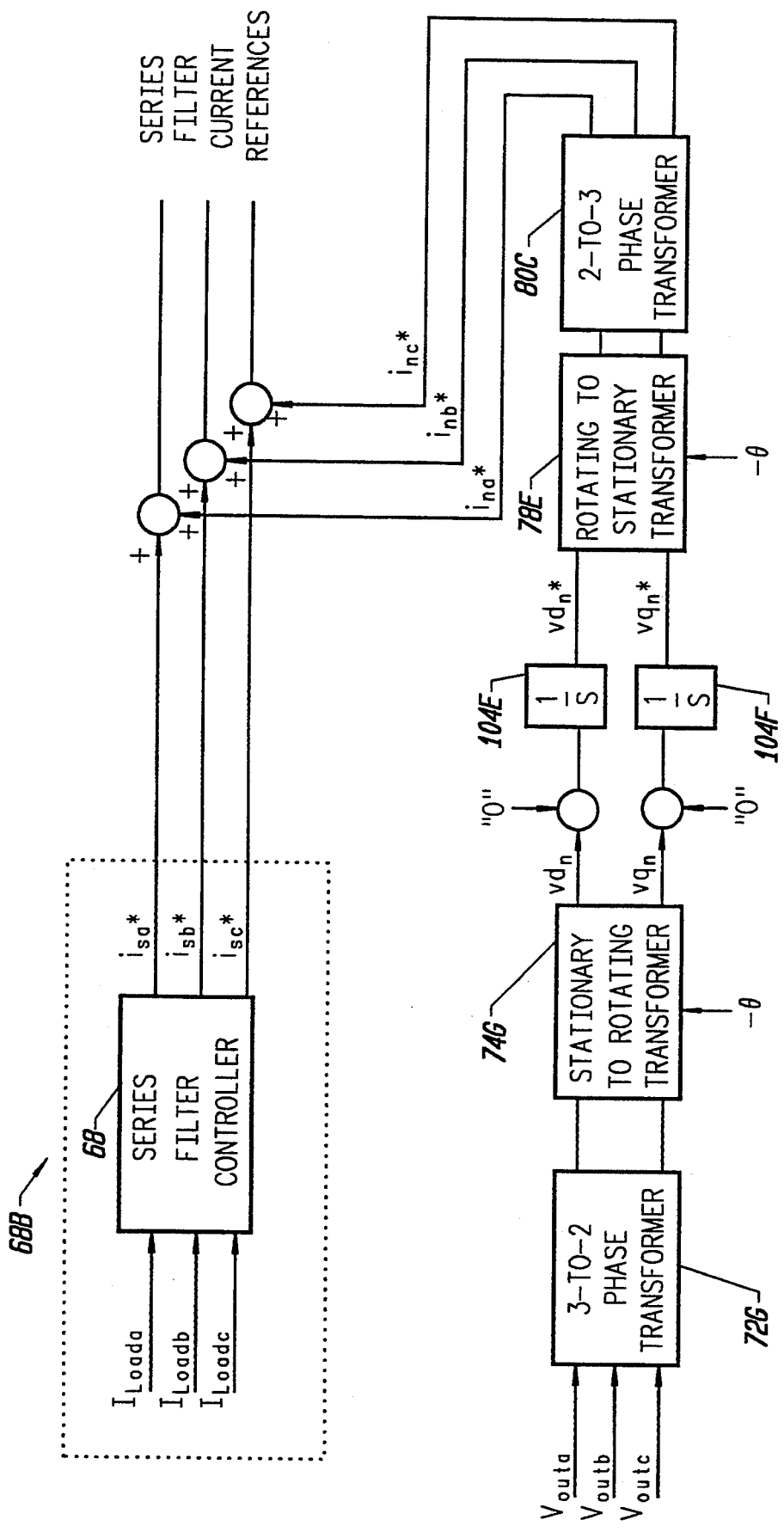
FIG. 22 is an apparatus for compensating for a negative sequence fundamental component within an output voltage.

FIG. 22 depicts a series filter controller 68B which eliminates the negative sequence fundamental voltage at the output of the controller 68B. The modified series filter controller 68B includes a series filter controller 68, of the type described in relation to FIG. 10. The series filter controller of this embodiment modifies the series filter current references, $i_{sa*}$, $i_{sb*}$, and $i_{sc*}$, to force balanced voltages on the output side of controller 68B. This is achieved by processing the output voltages $V_{outa}$, $V_{outb}$, and $V_{outc}$, in a manner as described in reference to FIG. 21, to produce $i_{na*}$, $i_{nb*}$, and $i_{nc*}$ current references required to eliminate the unbalance present in the output voltage.

The controllers 64D and 68B described in FIGS. 21 and 22 may be used to purposely unbalance the input currents or the output voltages. This is done by replacing the "zero" mixing value for $i_{dn}$, $i_{qn}$ or $v_{dn}$, $v_{qn}$ by constants corresponding to the desired unbalanced magnitude and phase. This feature is useful in performing tests to determine the effect of unbalance on various loads.

Attention now turns to another embodiment of the invention directed to solving the problem of relatively slow dynamic response in prior art active power line conditioners. The present invention solves this problem by deriving a load current fundamental signal and using it as a feedforward signal to achieve fast dynamic response.

Figure 23:
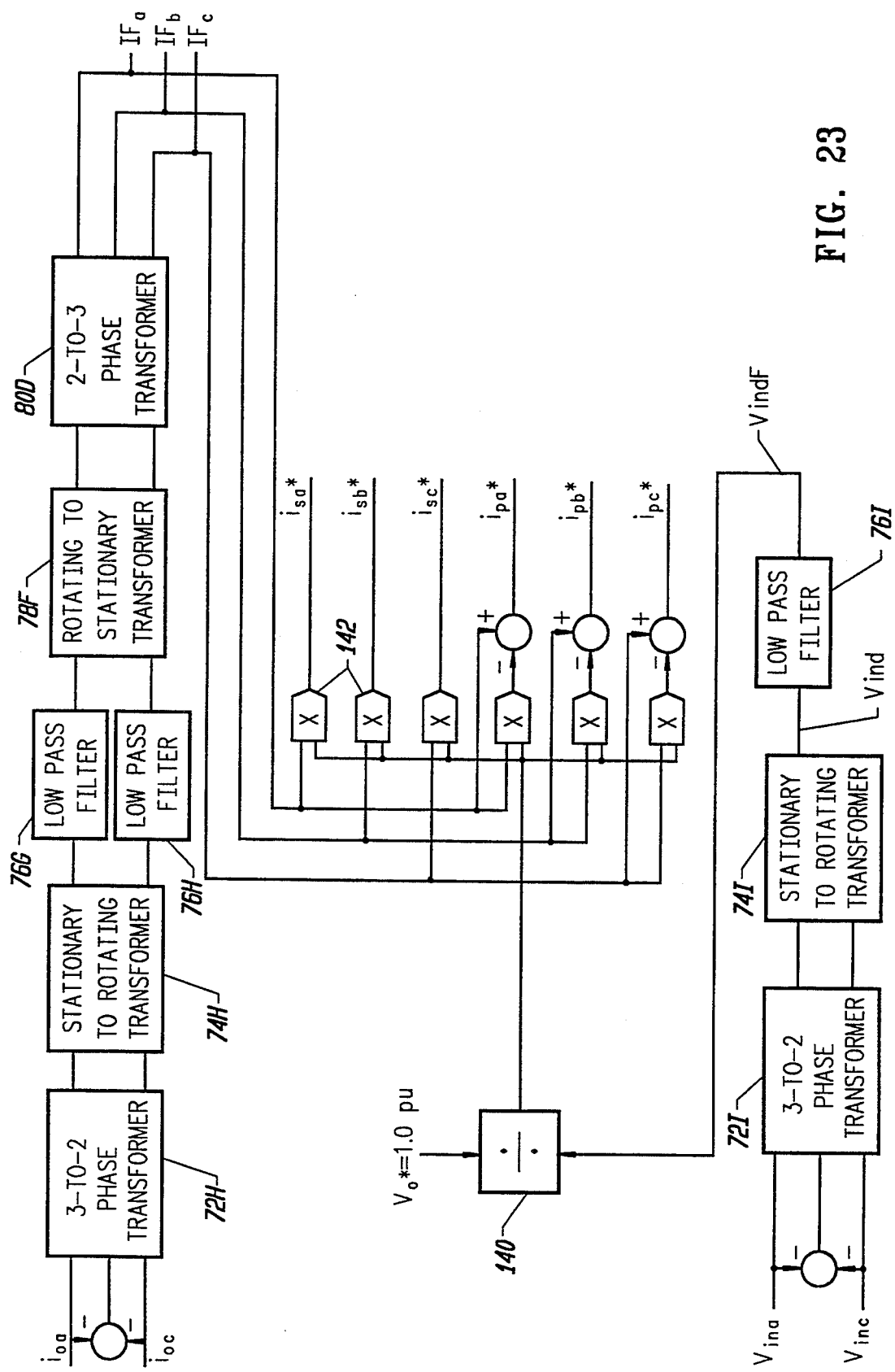
FIG. 23 depicts an apparatus for deriving the load current fundamental signal from a three phase load and multiplying the signal by the existing Vo/Vi ratio in order to use the product as a feed forward reference signal to provide fast dynamic response in an active power line conditioner.

One embodiment for deriving the load current fundamental signal in the case of a three phase system is depicted in FIG. 23. In particular, the load currents $i_{os}$ and $i_{oc}$ are subjected to synchronous transformations to yield the fundamental components of each phase ($I_{fa}$, $I_{fb}$, $I_{fc}$). That is, by processing the load currents through a 3-to-2 phase transformer 72H, a stationary-to-rotating transformer 74H, low pass filters 76G and 76H, rotating-to-stationary transformer 78F, and 2-to-3 phase transformer 80D, fundamental load signals are produced. As previously described, this processing generates a fundamental load current which is represented by a dc value. The low pass filters 76G and 76H extract these signals and inverse transformations are performed to render three phase fundamental values $I_{fa}$, $I_{fb}$, and $I_{fc}$. The three phase fundamental values may be directly used to derive a load current ripple signal which may be applied to an inverter. However, in a preferred embodiment of the invention, the three phase fundamental values are further processed to accommodate input voltage variations. This is achieved by adjusting the magnitude of the fundamental values as a function of the output/input voltage ratio. The output/input voltage ratio is obtained in the following manner. As indicated in FIG. 23, the three phase voltage input values are processed by a 3-to-2 phase transformer 72I and a stationary-to-rotating transformer 74I. The real or direct fundamental component of the input voltage $v_{ind}$ is then processed by low pass filter 76I to yield $V_{indf}$ which is equivalent to the magnitude of the input voltage. This value is then divided into a set output voltage value $V_o$ by divider 140 to establish the $V_o/V_i$ ratio. The output voltage value $V_o$ is constant, so it may be set to a 1.0 P.U. value.

As indicated in the figure, this ratio is then multiplied by the three phase fundamental values previously derived. This produces series reference signals $i_{sa*}$, $i_{sb*}$, and $i_{sc*}$ whose respective magnitudes are a function of the output/input voltage ratio. As shown in the figure, parallel reference signals $i_{pa*}$, $i_{pb*}$, and $i_{pc*}$ may be formed by subtracting the product of the voltage ratio and the three phase fundamental values from the three phase fundamental values. This provides power balance to compensate for the adjustment made to the series reference signals.

The apparatus of FIG. 23 relieves the link voltage regulator from compensating for the full extent of the power flow changes between the two inverters. In the absence of significant power exchange from the dc link, the active power line conditioner can adapt to changes rapidly. The slow response dc link voltage regulator is still necessary to compensate for the relatively small load current and voltage ratio measurement errors and for controlling the replenishment of inverter losses.

Figure 24:
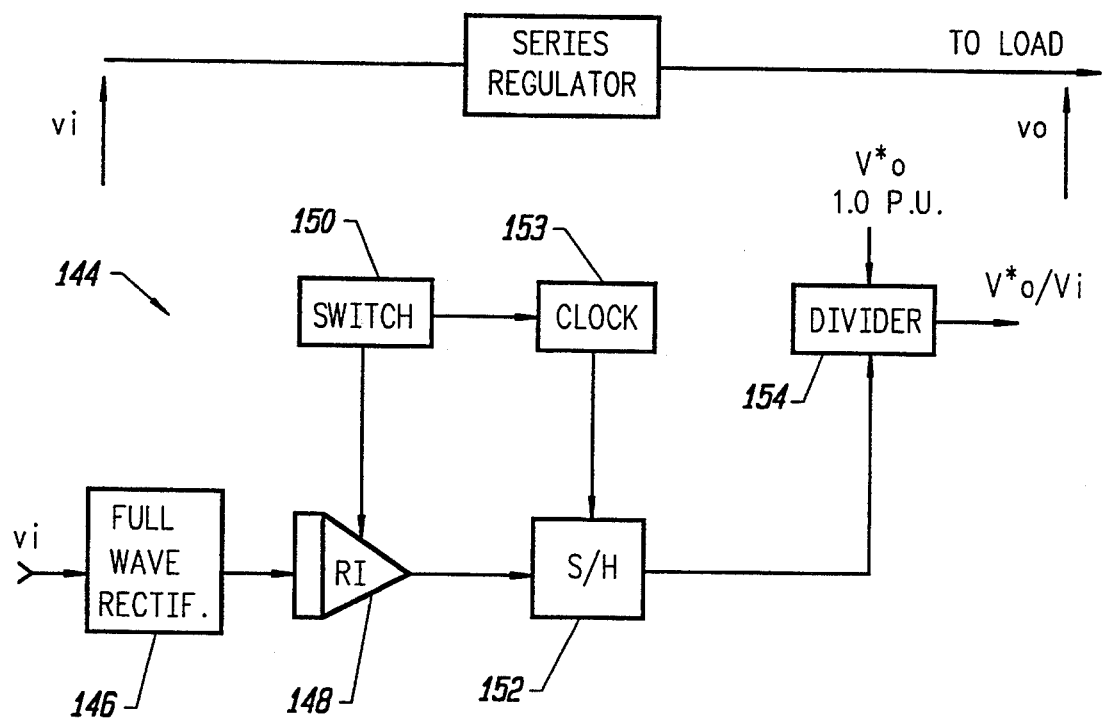
FIG. 24 is a single phase apparatus corresponding to the apparatus of FIG. 23; in particular, the figure depicts an apparatus for deriving an existing Vo/Vi ratio.

The load current fundamental signal feedforward principles disclosed in relation to a three phase power supply may also be applied to a single phase power supply. FIG. 24 depicts a voltage ratio sensor 144 which may be used to establish the Vo/Vi ratio.

The active power line conditioner input voltage Vi is processed by full wave rectifier 146. The average value of the rectified signal is established by resettable integrator 148. As is known in the art, a resettable integrator 148 includes an operational amplifier with a capacitive feedback. An electronic switch 150 is used to discharge the capacitor. When the capacitor is discharged the output of the operational amplifier is zero volts. When the switch is opened, the output of the operational amplifier is a function of the current through the input resistor of the operational amplifier.

The resettable integrator 148 is recharged once a cycle. When it is not discharged, it builds up a voltage. Before discharge, the voltage is sampled with a sample and hold device 152, which is latched by clock 153. The pattern at the output of the integrator does not change, thus, the output of the sample and hold device 152 is a constant voltage corresponding to the average voltage. The constant voltage may then be divided into a power unit of 1.0 by divider 154 to yield a Vo/Vi ratio.

If the input signal is symmetrical (the negative half cycle and the positive half cycle are equivalent) it is sufficient to reset the integrator every half cycle, providing a faster measurement of the average voltage.

The input voltage value may also be derived through digital techniques, such as the "sliding window" approach described in U.S. Pat. No. 4,811,236, which is incorporated by reference herein.

Figure 25:
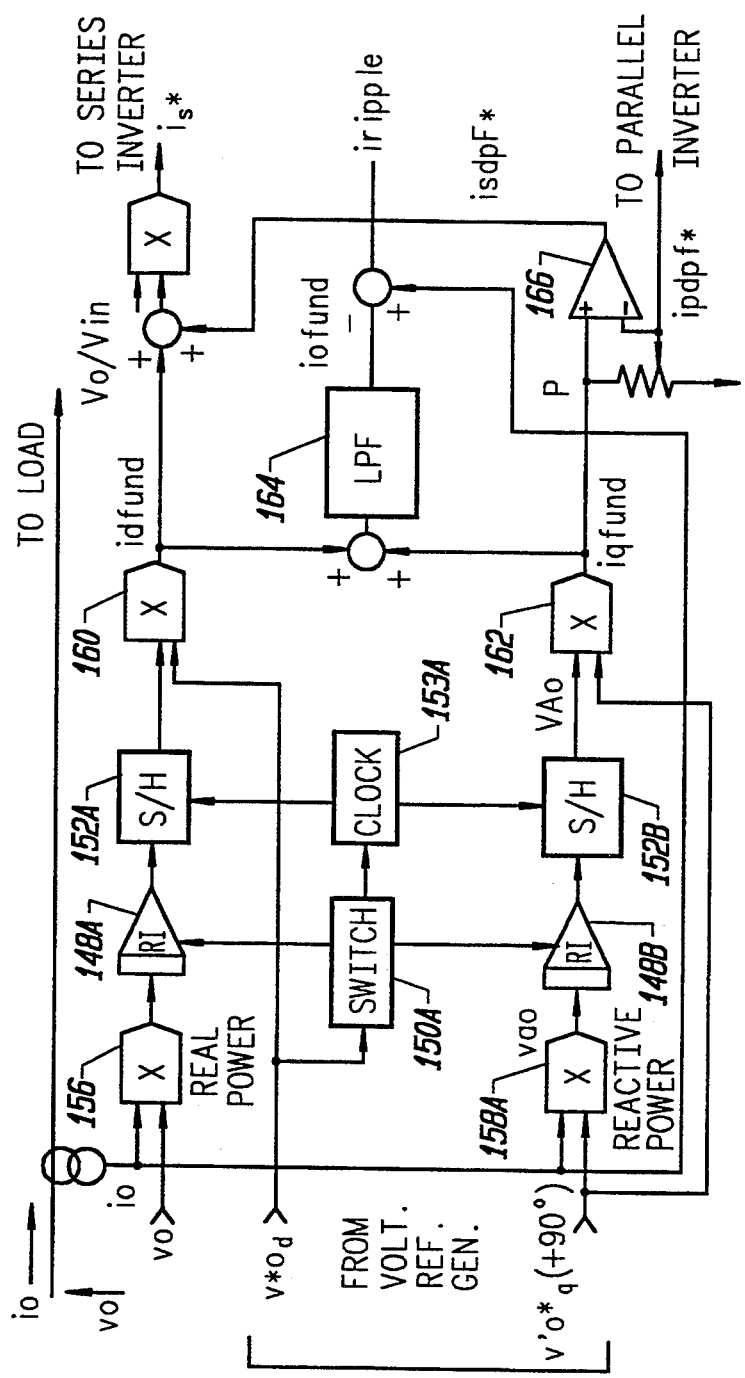
FIG. 25 is a single phase apparatus corresponding to the apparatus of FIG. 23; in particular, the figure depicts an apparatus for deriving the load current fundamental and for providing an adjustable degree of displacement power factor (DPF) correction.

As depicted in FIG. 25, the single phase load current fundamental can be measured in a manner analogous to the technique described in relation to FIG. 24. The real and reactive components of the load current are derived, added, and then filtered to yield the load current fundamental.

The real power is calculated by multiplying the instantaneous load voltage Vo and current signal Io with multiplier 156. The reactive power is obtained by using multiplier 158A to multiply the load current Io by a 1.0 power unit sinusoidal reference Vo,, 90 degrees shifted by the output voltage. The resulting power signals have heavy second and possibly other harmonic contents depending on the nonlinearity of the load current. The reactive power signal has heavy 120 Hz AC component which must be filtered in order to obtain a dc signal. Thus, further processing is necessary. In particular, the outputs of the multipliers are respectively processed by resettable integrators 148A and 148B, and sample and hold devices 152A and 152B, as controlled by switch 150A and clock 153A, in a manner consistent with the description of the apparatus of FIG. 24. This processing results in dc amplitude signals which are respectively proportional to the real power and the reactive power. The dc amplitude signals may also be obtained through digital techniques, such as the "sliding window" approach described in U.S. Pat. No. 4,811,236.

In order to get sine waves which are proportional in phase and magnitude to the real and reactive components, the dc signals are multiplied by the input voltages in phase and quadrature to obtain the real fundamental sine wave and the reactive fundamental sine wave. That is, multipliers 160 and 162 are used to multiply the measured dc amplitude signals by unit magnitude sinusoidal reference signals in phase and in quadrature with the output voltage. The resultant signals, $i_{dfund}$ and $i_{qfund}$, are added and then passed through a 60 Hz low pass filter 164, to yield the fundamental output signal $i_{ofund}$. This signal may be subtracted from the actual load current $i_o$ to obtain a ripple signal $i_{ripple}$ corresponding to the load current.

The real and reactive components of the fundamental signal may be used as inverter references, as indicated in FIG. 25. Namely, the reactive component of the load current fundamental signal $i_{qfund}$ is divided into two signals by the setting on the potentiometer P. This proportional reference setting for partial power factor correction of the displacement power factor establishes the parallel reference signal $i_{pdpf*}$ and the input to the differential amplifier 166. The output of the differential amplifier 166 represents the uncompensated part of the reactive load current, $i_{sdpf*}$ which is allowed to flow back into the input line of the APLC. The reference current $I_{sdpf*}$ is added to the real portion of the load fundamental current $i_{dfund}$. The resultant sum is multiplied by the Vo/Vi ratio established by the apparatus of FIG. 24 to produce the series inverter reference signal $i_{s*}$.

Figure 26:
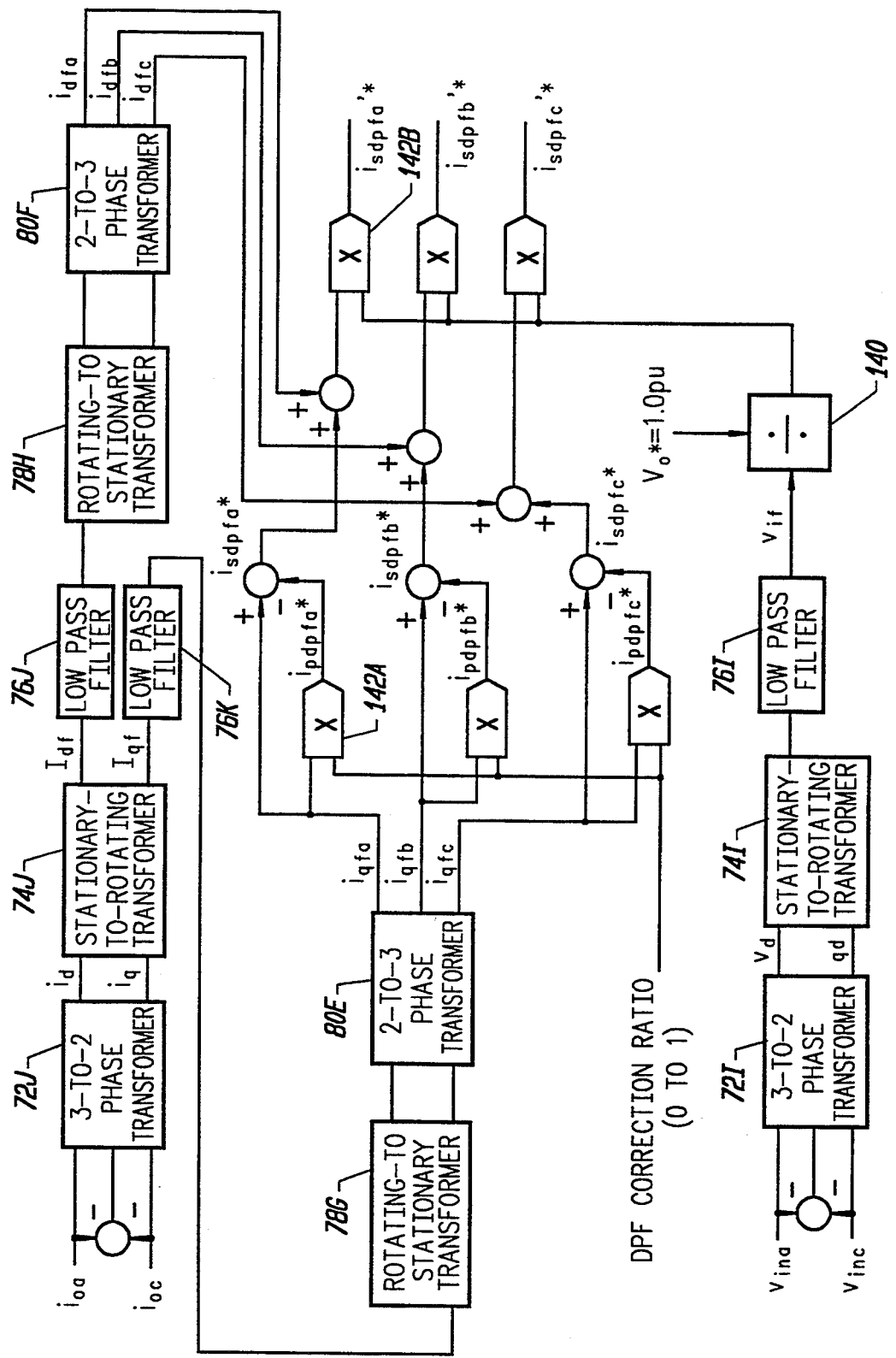
FIG. 26 is an alternate apparatus for providing a fundamental load current series reference signal; in particular, the figure depicts a mechanism for multiplying the fundamental load current signal by both a user-set displacement power factor correction ratio value and by the instantaneous output/input voltage ratio to provide an improved series reference signal.

Turning now to FIG. 26, an alternate apparatus for providing a fundamental load current series reference signal is depicted. The apparatus of FIG. 26 provides unified power factor control for an APLC. This unified power factor control is achieved by providing a mechanism for multiplying the fundamental load current signal by both a user-set displacement power factor correction ratio value and by the instantaneous output/input voltage ratio. This unified power factor control results in an improved series reference signal.

The three-phase instantaneous load current fundamental signal is derived by synchronously processing each phase of the load current ($i_{os}$, $i_{ob}$, and $i_{os}$). As depicted, these signals are processed by a 3-to-2 phase transformer 72J and a stationary-to-rotating transformer 74J. As previously discussed, the advantage of this processing technique is that in the synchronous reference frame the fundamentals of the real ($I_{df}$) and reactive ($I_{qf}$) load currents are represented as dc values. Thus, low pass or other filters 76J and 76K can be used to obtain the magnitude of the real fundamental and reactive fundamental signals.

The reactive fundamental signal is processed by rotating-to-stationary transformer 78G. Since only the $I_{qf}$ signal is being applied to the rotating-to-stationary transformer 78G, the signal is multiplied by the first column of the matrix which includes cos Θ and sin Θ terms. The signal is then processed by 2-to-3 phase transformer 80E to yield the three phase quadrature fundamental signals $i_{qfa*}$, $i_{qfb*}$, and $i_{qfc*}$. These signals are respectively multiplied by multipliers 142 that represent the predefined displacement power factor (DPF) correction ratio. The product of this step is then subtracted from the respective quadrature fundamental signals to produce intermediate series reference signals $i_{sdpfa}$, $i_{sdpfb}$, and $i_{sdpfc}$. The intermediate series reference signals are then mixed with the real (direct) components of the fundamental load current. The respective sums are then multiplied by the instantaneous active power line conditioner voltage output/input ratio. This ratio may be established by the same elements used to derive the ratio in FIG. 23. The resultant series fundamental power factor corrected signals $i_{sdpfa*}$, $i_{sdpfb*}$, and $i_{sdpfc*}$ may be applied to the series inverter 52.

As described in relation to FIG. 23, power balance must be maintained in the active power line conditioner. Thus, the processing performed on the series inverter reference signal must be compensated on the parallel inverter reference signal. In other words, the parallel inverter 54 corrects for the power factor modification. That part of the reactive current which is not corrected is sent back to the transmission line through the series inverter 52. That part of the reactive current which is corrected is handled by the parallel inverter 54. The three phase parallel inverter reference signals for displacement power factor correction are equal to $i_{pdpfa*}$, $i_{pdpfb*}$, and $i_{pdpfc*}$.

Attention now turns to another active power line conditioner in accordance with the invention. The active power line conditioners discussed up to this juncture have relied upon the series inverter for current control and the parallel inverter for voltage control. In accordance with another aspect of the invention, it is desirable to reverse these functions to provide an active power line conditioner which is highly fault tolerant.

Figure 27:
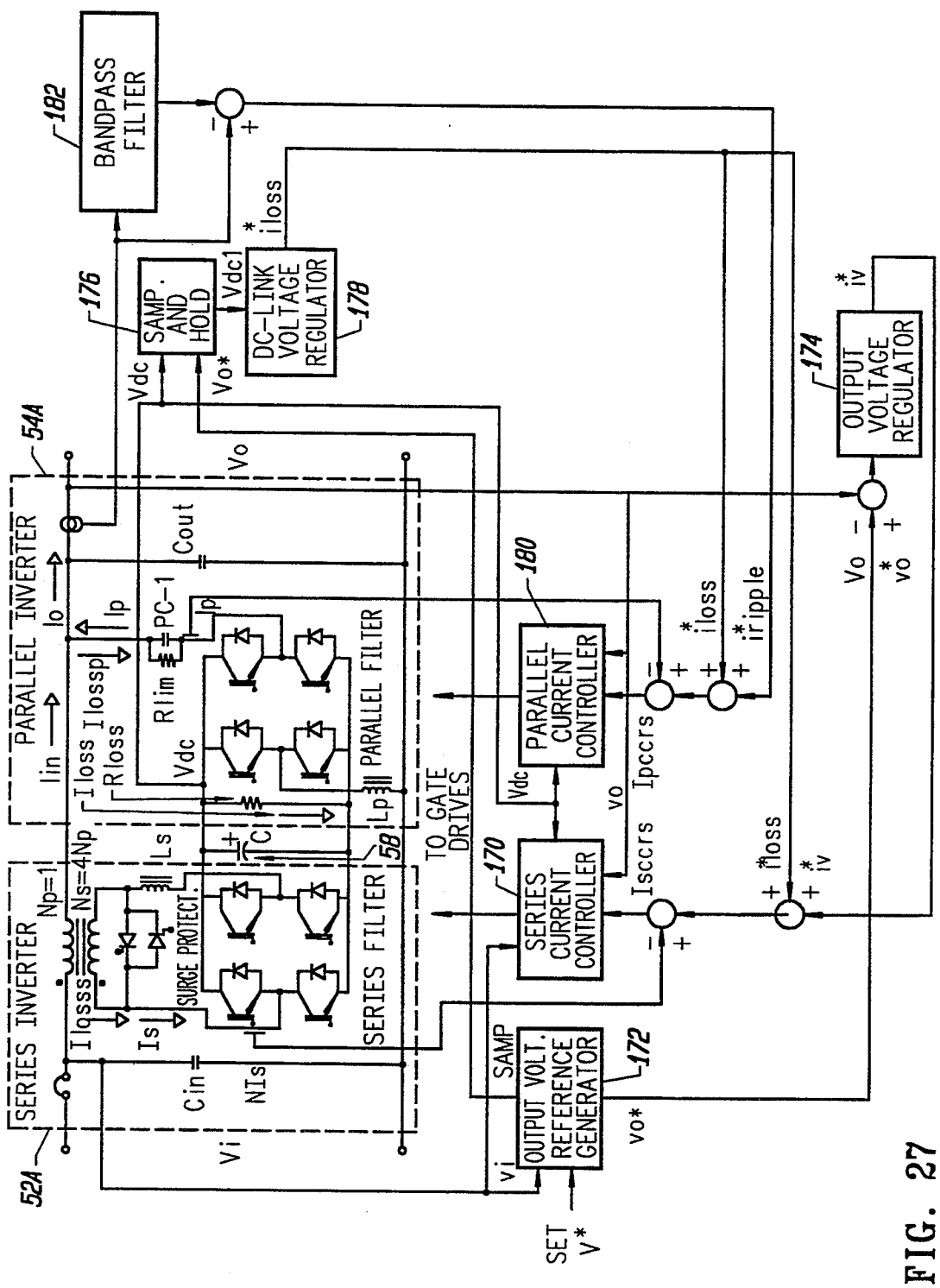
FIG. 27 depicts an apparatus which relies upon dedicated functions for the series and parallel inverters to provide optimal control and protection within an active power line conditioner.

FIG. 27 depicts a highly fault tolerant active power line conditioner in which the parallel inverter 52A is used for current control functions and the series inverter 54A is used for output voltage regulation. In the prior embodiments of the invention, and in the prior art, the series inverter has been used for current control. In this topology, if the series inverter is shorted to the input transmission line, then the parallel inverter attempts to regulate the transmission line voltage, causing saturation of the parallel inverter. With the present invention, the series inverter is dedicated to voltage control. Therefore, a short at the input of the series inverter does not cause large transients on the parallel inverter.

The series current controller 170 of FIG. 27 may be a pulse width modulated controller of the type known in the art. As indicated in the figure, the series current controller 170 receives an APLC voltage input signal Vi and an APLC voltage output signal Vo. The series current controller 170 is further controlled by an output voltage reference signal Vo* produced by an output voltage reference generator 172. The output voltage reference, Vo*, is a unity amplitude sinusoidal signal normally in phase with the input voltage Vi. Vo, may be derived from the input voltage via phase locked loops or by unity output voltage bandpass filters, known in the art. Synchronous coordinate transformation techniques, as previously described, may be used to derive the $V_{o^*}$ signal in a three phase embodiment.

The unity amplitude voltage reference Vo, is summed with the instantaneous output voltage to produce an error signal which is processed by the output voltage regulator 174, which may be a proportional-integral voltage regulator. The voltage regulator 174 acts on the series inverter 52A. Prior art voltage regulators act upon parallel inverters. The voltage regulator output signal $i*_v$ is then mixed with a signal $i*_{loss}$ corresponding to the energy storage element 58 (dc link) current activity. This signal is obtained by periodically sampling the dc link voltage level with a sample and hold device 176. The output of the sample and hold device 176 is compared with the constant dc voltage reference, vo*, by a dc-link voltage regulator 178, which may be a proportional-integral regulator. In a digital implementation, a one cycle "sliding-window" technique may be employed, as described in U.S. Pat. No. 4,811,236. In either event, an $i*_{loss}$ signal is generated which corresponds to current leaving the dc link.

The $i*_{loss}$ signal is added with the voltage regulator output signal $i*_v$ to produce an intermediate series current reference signal. The series filter input current Is is then subtracted from the intermediate series current reference signal to provide a series current controller reference signal $I_{sccr}$. The series current controller reference signal is a minor loop within the otherwise voltage controlled series inverter. As discussed, the series controller receives an APLC input voltage Vi and output voltage Vo. In addition, it receives a dc link voltage value Vdc. In sum, the control signals provided by the series current controller are primarily determined by the input voltage values.

In contrast, parallel filter control is achieved primarily through current reference signals. Parallel current controller 180 receives a current reference signal based upon a number of current signal references. An $i*_{ripple}$ signal is produced by feeding the parallel inverter output current Io through a bandpass filter 182 to recover the fundamental portion of the output current. This fundamental portion is then subtracted from the output current to yield the $i*_{ripple}$ signal, which is used to control the load ripple components. The $i*_{ripple}$ signal is then added to the $i*_{loss}$ signal, previously described. The $i*_{loss}$ signal is used to provide current to maintain the dc link voltage at a constant level. The sampled parallel filter current $I_p$ is then subtracted from the sum of the $i*_{loss}$ and $i*_{ripple}$ signals to produce a parallel current control reference signal $I_{pccrs}$. As indicated in FIG. 27, the parallel current controller 180 also receives the sampled dc link voltage signal Vdc and the output voltage signal Vo.

Figure 28A:
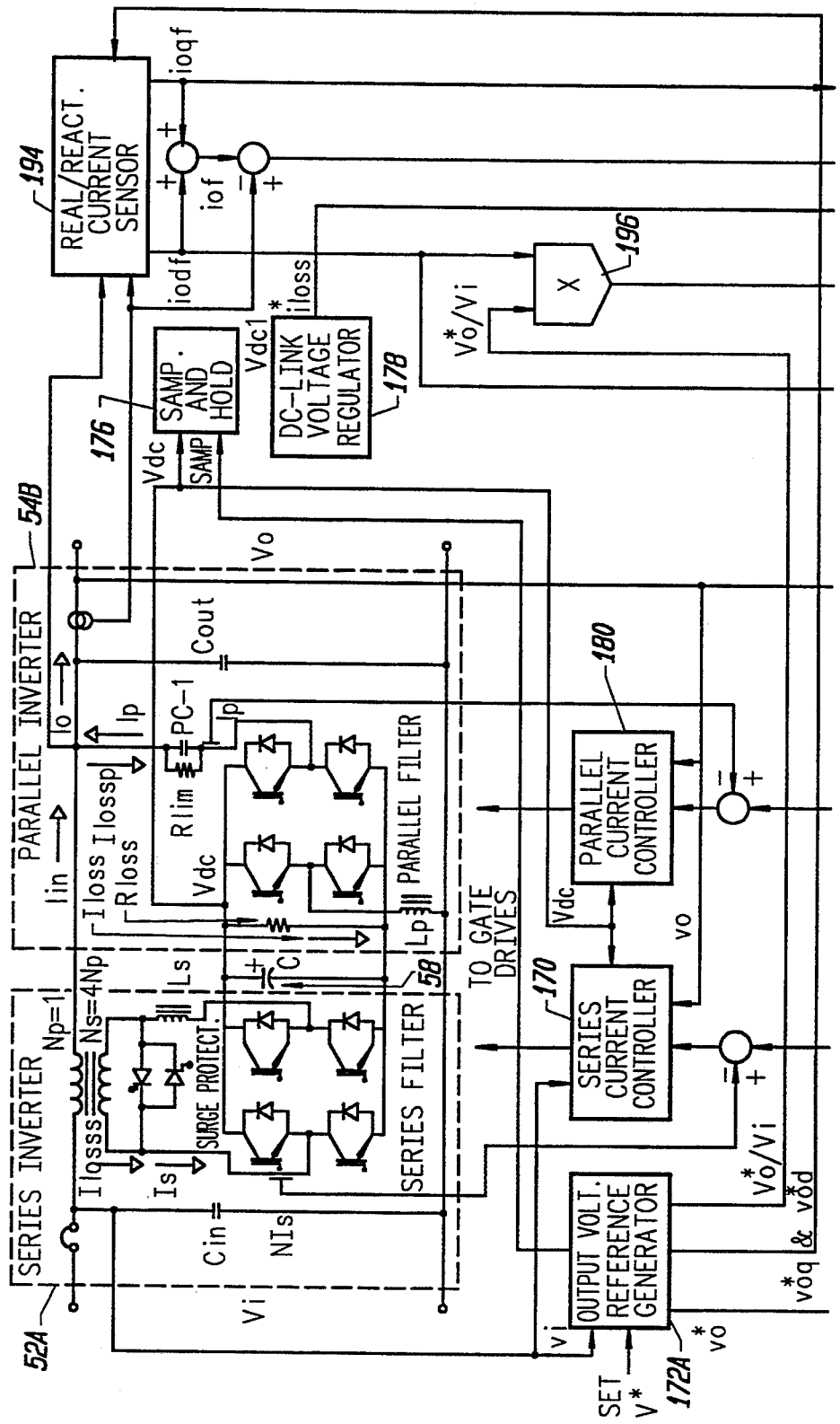
FIG. 28 depicts an apparatus which relies upon dedicated functions for the series and parallel inverter, and current limiting apparatus, to provide optimal control and protection within an active power line conditioner.
Figure 28B:
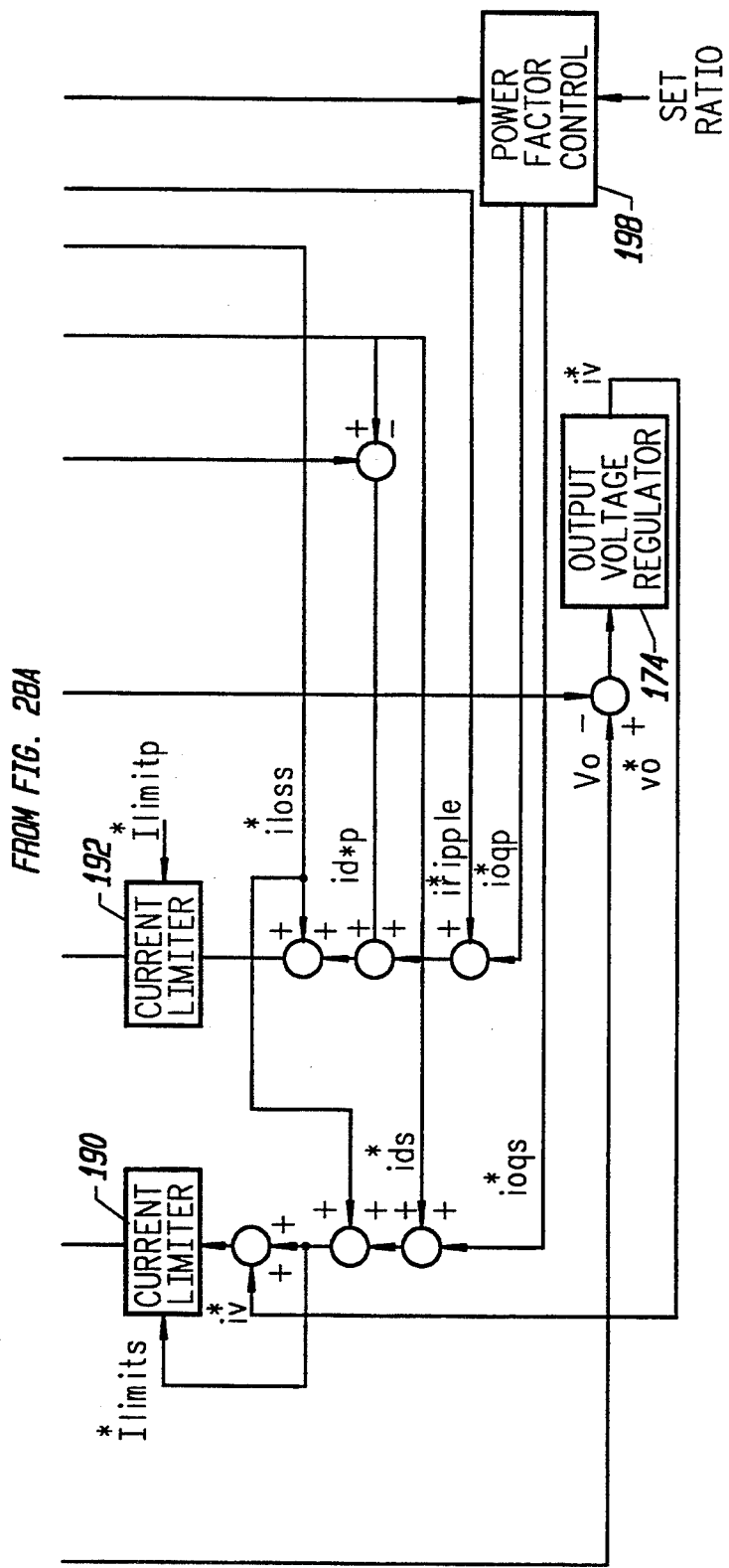

FIG. 28 depicts an alternate embodiment of the apparatus of FIG. 27. In particular, the apparatus of FIG. 28 includes a series current limiter 190 and a parallel current limiter 192. Preferably, the parallel current limiter 192 is fixed to satisfy specified output voltage total harmonic distortion requirements or peak to rms output current ratios in the active power line conditioner. The limit in the series current limiter 190 is set slightly above the peak of the active power line conditioner input current fundamental. The series current limit allows the onset of a small intentional peak output voltage distortion that in turn limits excessive nonlinear load peak currents without back feeding of current harmonics into the input supply of the APLC.

In addition to the current limiting features associated with the active power line conditioner of FIG. 28, a number of other previously discussed features of the invention are incorporated within apparatus. A real/reactive current sensor 194 is provided. This apparatus is similar to the apparatus described in relation to FIG. 25. Note that the real/reactive current sensor 194 receives real and reactive voltage components and produces real and reactive current signals $i_{odf}$ and $i_{oqf}$. These signals may be added to produce a fundamental current signal which may be subtracted from the output current to produce an $i*_{ripple}$ signal. In addition, the real component of the fundamental signal $i_{odf}$ may be multiplied with a voltage output/input ratio Vo*/Vi by multiplier 196. The voltage output/input ratio may be established by output voltage reference generator 172A, which may utilize the apparatus of FIG. 24 to establish the ratio.

The product of the fundamental signal $i_{odf}$ and the voltage output/input ratio Vo,/Vi provides a series filter reference signal $i_{d*s}$ which is adjusted for output voltage variations. The parallel filter reference signal $i_{d*p}$ signal is formed by subtracting the $i_{d*s}$ from the fundamental signal $i_{odf}$. As previously discussed, this is done to provide power balance to compensate for the adjustment made to the series reference signal.

A power factor controller 198 may also be provided to incorporate a selected amount of displacement power factor correction ratio via signals $i*_{oqp}$ and $i*_{ops}$. The remaining current input signals have been discussed in relation to FIG. 27.

Figure 29:
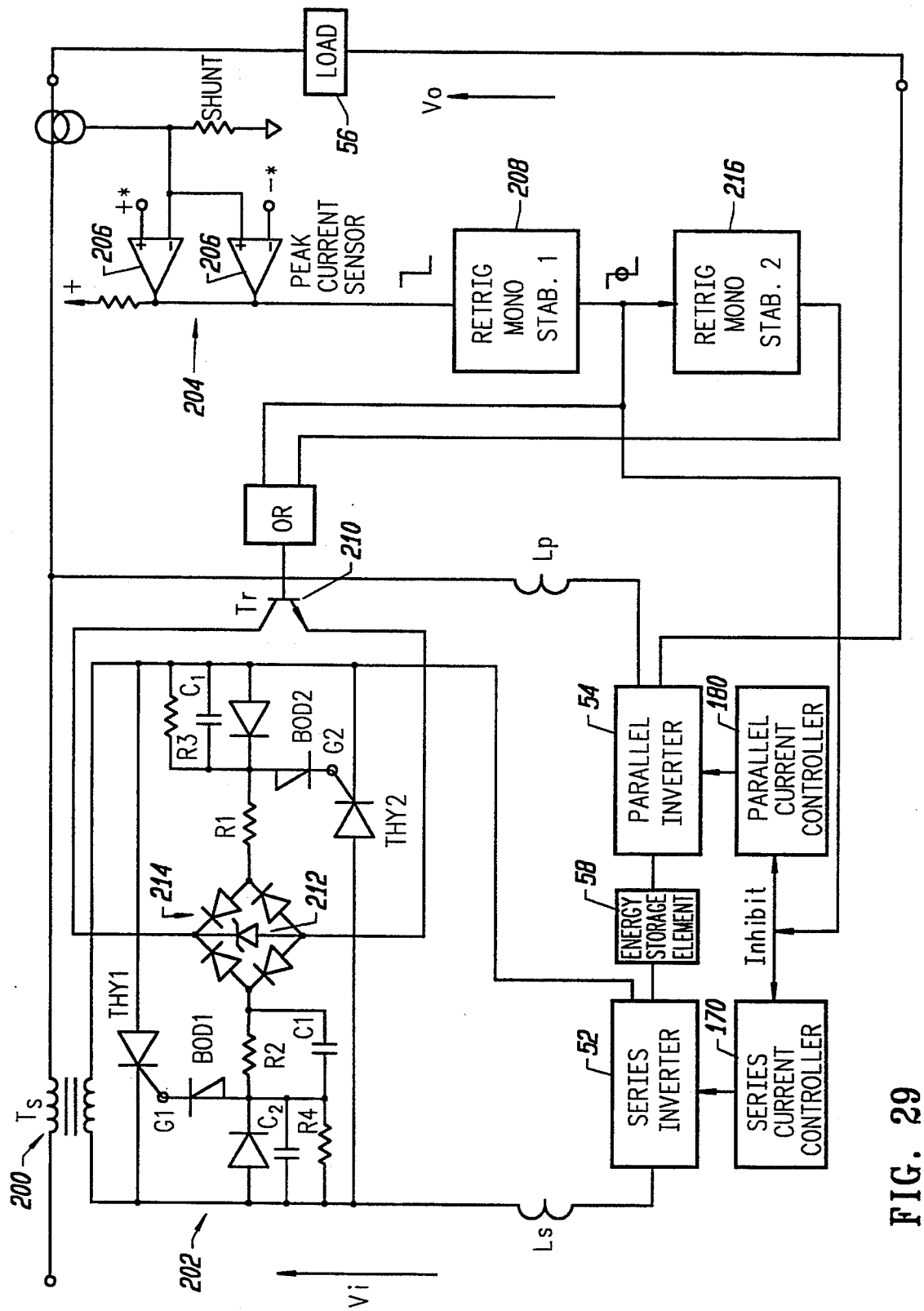
FIG. 29 depicts an active power line conditioner which employs a novel apparatus for shorting the series transformer in the presence of surge conditions, so as to provide an inexpensive overload device with fast recovery.

FIG. 29 depicts another apparatus, in accordance with the invention, for efficiently handling transient conditions. In short, the apparatus of FIG. 29 provides inexpensive overload protection. Instead of utilizing highly rated solid state components, the invention utilizes a technique wherein at least one of the series transformer windings is shorted during transient overload conditions.

In the presence of an output short circuit, or when switching on a large output capacitor, a very large series inverter current is produced. This may result in a dangerously high dc link voltage. To avoid this condition, the apparatus of FIG. 29 provides a method for temporarily shorting the transformer secondary in the presence of an over-voltage or an excess current situation.

The apparatus of FIG. 29 includes a series inverter 52, an energy storage element 58, such as a dc link, and a parallel inverter 54. The series inverter 52 is controlled by a series current controller 170, while the parallel inverter 54 is controlled by a parallel current controller 180. The figure also depicts transformer secondary 200 which is coupled to a fault condition shorting circuit 202 in accordance with the invention. The fault condition shorting circuit 202 does not require a dedicated power supply. Moreover, the same circuit is used for both over-voltage and excess current fault conditions. Thus, redundant protection is provided.

An excessive current situation may be detected by a standard peak current sensor circuit 204, which includes differential amplifiers 206 with inputs set to the threshold current values. A peak current signal is produced by the peak current sensor circuit 204 which activates a first retriggerable monostable circuit 208 which produces a gate drive inhibit signal for the series current controller 170 and the parallel current controller 180. The first retriggerable monostable circuit 208 also provides a base current signal for transistor 210, thereby producing an emitter current which shorts out zener diode 212 in rectifier bridge 214. As a result, the gates of thyristors THY1 and THY2 are fired by the transformer secondary voltage, as described below, causing the excess current to circulate in the fault condition shorting circuit 202.

The first retriggerable monostable circuit 208 is of the type which will produce the inhibit signal and the transistor drive signal for 10 milliseconds after the peak current sensor level has diminished. Additional inhibit and transistor drive signals may be provided by a second retriggerable monostable circuit 216 which is signal edge sensitive.

The fault condition shorting circuit 202 may also be activated in the presence of an over-voltage condition at the transformer secondary 200. The thyristors THY1 and THY2 are normally off, allowing a secondary voltage on the transformer 200, which is necessary for the series inverter 52 to operate. If the voltage exceeds a predetermined threshold, the thyristors are fired, shorting the current to the series inverter 52. The predetermined threshold is established by zener diode 212.

The zener diode 212 voltage is set to a threshold level. When the positive voltage level in the transformer secondary exceeds the zener diode 212 threshold, the rectifier bridge 214 conducts. This allows current to flow through R3. The flowing current allows a voltage to build up on parallel capacitor C1. When the voltage on C1 exceeds the threshold voltage of BOD2, C1 is discharged through BOD2, thereby firing the gate of thyristor THY2. This causes a short circuit within the fault condition shorting circuit 202. BOD2 is a standard break over device which requires a predetermined voltage at its anode before it will break down and conduct current.

If the over-voltage condition is not detected in the positive half cycle, then C2 will charge in the negative half cycle until the threshold voltage level of BOD1 is exceeded, thereby firing thyristor THY1, to produce the same shorted condition.

After an over-voltage condition, the voltage regulator (not shown) is preferably set to zero before normal operation of the transformer resumes. The thyristors preferably include standard snubbers (not shown).

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of operating an active power line conditioner which includes a series inverter coupled to a parallel inverter through an energy storage link, said method comprising the steps of:

utilizing said parallel inverter for current control functions within said active power line conditioner;

employing said series inverter for instantaneous output voltage regulation functions within said active power line conditioner;

limiting the current to said parallel inverter to satisfy a predetermined output voltage total harmonic distortion requirement; and restricting the current to said series inverter at a predetermined value slightly above a peak input current fundamental value.

2. An active power line conditioner comprising:

a series inverter coupled to an energy input source;

a parallel inverter coupled to a load;

an energy storage element electrically connected between said series inverter and said parallel inverter;

a series filter controller coupled to said series inverter, said series filter controller providing instantaneous output voltage regulation functions for said active power line conditioner; and a parallel filter controller coupled to said parallel inverter, said parallel filter controller providing instantaneous output voltage regulation functions within said active power line conditioner.

3. The apparatus of claim 2 wherein said series filter controller receives a voltage input signal corresponding to the voltage input signal to said active power line conditioner.

4. The apparatus of claim 2 wherein said series filter controller receives a voltage output signal corresponding to the voltage output signal of said active powerline conditioner.

5. The apparatus of claim 2 wherein said series filter controller receives an energy storage element voltage output signal corresponding to the voltage of said energy storage element.

6. The apparatus of claim 2 wherein said series filter controller receives a series current controller reference signal including a current component corresponding to current leaving said energy storage element.

7. The apparatus of claim 2 wherein said series filter controller receives a series current controller reference signal including a current component corresponding to a voltage output error.

8. The apparatus of claim 2 wherein said series filter controller receives a series current controller reference signal including a current component corresponding to a series filter input current.

9. The apparatus of claim 2 wherein said parallel filter controller receives a parallel current controller reference signal including a current component corresponding to current leaving said energy storage element.

10. The apparatus of claim 2 wherein said parallel filter controller receives a parallel current controller reference signal including a current component corresponding to the harmonic ripple of output current from said parallel inverter.

11. The apparatus of claim 2 wherein said parallel filter controller receives a parallel current controller reference signal including a current component corresponding to output current from said parallel inverter.

12. The apparatus of claim 2 wherein said parallel filter controller receives a voltage output reference signal corresponding to the output voltage of said active power line conditioner.

13. The apparatus of claim 2 wherein said parallel filter controller receives an energy storage element voltage reference signal corresponding to the output voltage of said energy storage element.

14. An active power line conditioner comprising:
a series inverter coupled to an energy input source;
a parallel inverter coupled to a load;
an energy storage element electrically connected between said series inverter and said parallel inverter;
a series filter controller and coupled to said series inverter, said series filter controller providing instantaneous output voltage regulation functions for said active powerline conditioner;
a current restricter coupled to said series inverter, said current restricter being set to satisfy a predetermined value slightly above a peak input current fundamental value;
a parallel filter controller coupled to said parallel inverter, said parallel filter controller providing instantaneous output voltage regulation functions within said active power line conditioner; and
a current limiter coupled to said parallel filter controller, said current limiter being set to satisfy a predetermined output voltage total harmonic distortion requirement.

15. The apparatus of claim 14 wherein said series filter controller receives a voltage input reference signal corresponding to the input voltage to said active power line conditioner.

16. The apparatus of claim 14 wherein said series filter controller receives a voltage output reference signal corresponding to the output voltage from said active power line conditioner.

17. The apparatus of claim 14 wherein said series filter controller receives an energy storage element voltage output signal corresponding tot he voltage output of said energy storage element.

18. The apparatus of claim 14 wherein said series filter controller receives a series current controller reference signal including a current component corresponding to current leaving said energy storage element.

19. The apparatus of claim 14 wherein said series filter controller receives a series current controller reference signal including a current component corresponding to a series filter input current.

20. The apparatus of claim 14 wherein said series filter controller receives a series current controller reference signal including a current component corresponding to a series displacement power factor correction value.

21. The apparatus of claim 14 wherein said series filter controller receives a series current controller reference signal including a current component corresponding to a voltage output error.

22. The apparatus of claim 14 wherein said series filter controller receives a series current controller reference signal including a current component corresponding to a product of a derived real fundamental component of an output current from said parallel inverter and a voltage output/input ratio for said active powerline conditioner.

23. The apparatus of claim 14 wherein said parallel filter controller receives a parallel current controller reference signal including a current component corresponding to current leaving said energy storage element.

24. The apparatus of claim 14 wherein said parallel filter controller receives a parallel current controller reference signal including a current component corresponding to output current from said parallel inverter.

25. The apparatus of claim 14 wherein said parallel filter controller receives a parallel current controller reference signal including a current component corresponding to the harmonic ripple of output current from said parallel inverter.

26. The apparatus of claim 14 wherein said parallel filter controller receives a parallel current controller reference signal including a current component corresponding to a parallel displacement power factor correction value.

27. The apparatus of claim 14 wherein said parallel filter controller receives a parallel current controller reference signal including a current component corresponding to a voltage output error.

28. The apparatus of claim 14 wherein said parallel filter controller receives a voltage output reference signal corresponding to the voltage output of said active power line conditioner.

29. The apparatus of claim 14 wherein said parallel filter controller receives an energy storage element output voltage corresponding to the output voltage of said energy storage element.

* * * * *